US009473828B2

(12) United States Patent
Wang et al.

(10) Patent No.: US 9,473,828 B2
(45) Date of Patent: *Oct. 18, 2016

(54) SYSTEM AND METHOD FOR MATCHING TARGETED ADVERTISEMENTS FOR VIDEO CONTENT DELIVERY

(75) Inventors: Qi Wang, Irvine, CA (US); Shu Wang, Irvine, CA (US); Yu Huang, Bridgewater, NJ (US); Hong Heather Yu, West Windsor, NJ (US); Dong-Qing Zhang, Plainsboro, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 521 days.

This patent is subject to a terminal disclaimer.

(21) Appl. No.: 12/958,102

(22) Filed: Dec. 1, 2010

(65) Prior Publication Data
US 2011/0185381 A1 Jul. 28, 2011

Related U.S. Application Data

(60) Provisional application No. 61/299,223, filed on Jan. 28, 2010.

(51) Int. Cl.
*H04N 7/025* (2006.01)
*G06Q 30/00* (2012.01)
(Continued)

(52) U.S. Cl.
CPC .............. *H04N 21/84* (2013.01); *G06Q 30/02* (2013.01); *G06Q 30/0255* (2013.01); *G06Q 30/0269* (2013.01); *H04N 21/23424* (2013.01);
(Continued)

(58) Field of Classification Search
CPC ................ H04N 21/23424; H04N 21/25891; H04N 21/4756; H04N 21/6582; H04N 21/84; H04N 21/8456; G06Q 30/02; G06Q 30/0255; G06Q 30/0269

USPC .................... 725/32, 34–36; 705/14.4–14.73
See application file for complete search history.

(56) References Cited

U.S. PATENT DOCUMENTS 6,804,659 B1 10/2004 Graham et al.
7,050,988 B2 5/2006 Atcheson et al.
(Continued)

FOREIGN PATENT DOCUMENTS

WO WO 2007/048432 A1 5/2007
WO WO 2008/056358 A2 5/2008

OTHER PUBLICATIONS

"Basic Formal Ontology (BFO)," IFOMIS, http://www.ifomis.org/bfo, Oct. 18, 2010, 1 page.
(Continued)

*Primary Examiner* — Kyu Chae
(74) *Attorney, Agent, or Firm* — Slater Matsil, LLP

(57) ABSTRACT

In accordance with an embodiment, a method of matching video content to advertising content includes electronically receiving a video content metadata from a content provider, and matching the video content metadata to advertising content metadata of a global list of advertisements. The video content metadata corresponds to video content being sent to a user device and includes at least one keyword. Furthermore, the advertising content metadata corresponds to advertising content and includes at least one keyword. Matching the video content metadata to advertising content metadata includes comparing the at least one keyword of the video content metadata to the at least one keyword of the advertising content metadata.

30 Claims, 20 Drawing Sheets

(51) Int. Cl.
*H04N 21/84* (2011.01)
*G06Q 30/02* (2012.01)
*H04N 21/234* (2011.01)
*H04N 21/258* (2011.01)
*H04N 21/475* (2011.01)
*H04N 21/658* (2011.01)
*H04N 21/845* (2011.01)

(52) U.S. Cl.
CPC .... *H04N21/25891* (2013.01); *H04N 21/4756* (2013.01); *H04N 21/6582* (2013.01); *H04N 21/8456* (2013.01)

(56) References Cited

U.S. PATENT DOCUMENTS

| | | |
|---|---|---|
| 7,136,875 B2 | 11/2006 | Anderson et al. |
| 7,260,823 B2 | 8/2007 | Schlack et al. |
| 7,370,342 B2 | 5/2008 | Ismail et al. |
| 7,526,722 B2 | 4/2009 | Wadhwa |
| 8,321,889 B2 | 11/2012 | Wong et al. |
| 2001/0042249 A1 | 11/2001 | Knepper et al. |
| 2001/0049620 A1 | 12/2001 | Blasko |
| 2002/0059399 A1* | 5/2002 | Learmonth ............ 709/219 |
| 2002/0129368 A1* | 9/2002 | Schlack ............ G06Q 30/02 725/46 |
| 2003/0093792 A1 | 5/2003 | Labeeb et al. |
| 2004/0054572 A1* | 3/2004 | Oldale ............ G06F 17/30699 706/1 |
| 2005/0165782 A1 | 7/2005 | Yamamoto |
| 2005/0216516 A1 | 9/2005 | Calistri-Yeh et al. |
| 2006/0029093 A1 | 2/2006 | Van Rossum |
| 2006/0074769 A1 | 4/2006 | Looney et al. |
| 2006/0242016 A1 | 10/2006 | Chenard |
| 2007/0067297 A1 | 3/2007 | Kublickis |
| 2007/0204310 A1 | 8/2007 | Hua et al. |
| 2007/0245379 A1 | 10/2007 | Agnihortri |
| 2009/0006375 A1 | 1/2009 | Lax et al. |
| 2009/0007195 A1 | 1/2009 | Beyabani |
| 2009/0037262 A1* | 2/2009 | Patil .................. 705/14 |
| 2009/0164419 A1* | 6/2009 | Taylor et al. ............ 707/3 |
| 2009/0234784 A1 | 9/2009 | Buriano et al. |
| 2010/0161441 A1* | 6/2010 | Hounsell .............. 705/26 |
| 2010/0235220 A1 | 9/2010 | Guha et al. |
| 2011/0078723 A1* | 3/2011 | Stettner et al. ........... 725/32 |
| 2011/0082824 A1 | 4/2011 | Allison et al. |
| 2011/0184807 A1* | 7/2011 | Wang et al. ............ 705/14.53 |
| 2011/0185384 A1* | 7/2011 | Wang et al. ............ 725/34 |
| 2012/0102523 A1* | 4/2012 | Herz et al. ............ 725/34 |

OTHER PUBLICATIONS

"Basic Formal Ontology (BFO): Overview," IFOMIS, http://www.ifomis.org/bfo/overview, Nov. 22, 2010, 1 page.

"Top-Level Categories," www.jfsowa.com/ontology/toplevel.htm, Oct. 18, 2011, pp. 1-8.

Ono, C., et al., "A Context-Aware Movie Preference Model Using a Bayesian Network for Recommendation and Promotion," UM 2007, pp. 257-267, Springer-Verlag Berlin Heidelberg 2007.

Tsinaraki, C., et al., "A Mulitmedia User Preference Model that Supports Semantics and its Application to MPEG 7/21," 2006 IEEE, pp. 35-42.

Wang et al., U.S. Appl. No. 12/958,072, filed Dec. 1, 2010, Final Office Action dated May 16, 2013, 47 pages.

Wang et al., U.S. Appl. No. 12/957,972, filed Dec. 1, 2010, Final Office Action dated May 17, 2013, 50 pages.

Wang et al., U.S. Appl. No. 12/958,072, filed Dec. 1, 2010, Non-Final Office Action dated Jan. 14, 2013, 41 pages.

Wang et al., U.S. Appl. No. 12/957,972, filed Dec. 1, 2010, Non-Final Office Action dated Jan. 15, 2013, 42 pages.

* cited by examiner

Global Ads_Play_Table

| VS1 | → | Ads11 \| Category | → | Ads12 \| Category | ...... | $VS_i$ Denotes video segment. |
| VS2 | → | Ads21 \| Category | → | Ads22 \| Category | ...... | $Ads_{i1}$......$Ads_{im}$ Denotes the candidate advertisement set of $VS_i$ which is the output of semantic matching algorithm. |
| ... | | . . . | | . . . | | |
| VSn | → | Adsn1 \| Category | → | Adsn2 \| Category | ...... | |

*Fig 11a*

User preference Matrix

| | $Adc_1$ | $Adc_2$ | ...... | $Adc_m$ | |
|---|---|---|---|---|---|
| $VSc_1$ | $a_{11}$ | | | $a_{1m}$ | $a_{ij} = (a_{ij}^l, a_{ij}^d, h_{ij})(1 \leq i \leq n, 1 \leq j \leq m)$ Presents user's preference on $(VSc_i \| category, Adc_j \| category)$ combination. |
| $VSc_2$ | $a_{21}$ | | | $a_{2m}$ | $VSc_n$ denotes video segment category. |
| ... | | | | | $Adc_m$ denotes advertisement category. |
| $VSc_n$ | $a_{n1}$ | | | $a_{nm}$ | |

*Fig 11b*

User profile Matrix

|  | $Adc_1$ | $Adc_2$ | ...... | $Adc_m$ |
|---|---|---|---|---|
| $UPc_1$ | $a_{11}$ | ...... | ...... | $a_{1m}$ |
| $UPc_2$ | $a_{21}$ | ...... | ...... | $a_{2m}$ |
| ... | ...... | ...... | ...... | ...... |
| $UPc_n$ | $a_{n1}$ | ...... | ...... | $a_{nn}$ |
| $USc_1$ | $a_{11}$ | ...... | ...... | $a_{1m}$ |
| $USc_2$ | ...... | ...... | ...... | ...... |
| ... | ...... | ...... | ...... | ...... |
| $USc_k$ | $a_{k1}$ | ...... | ...... | $a_{km}$ |

$a_{ij} = (a_{ij}^1, a_{ij}^d, h_{ij}) (1 \leq i \leq n, 1 \leq j \leq m)$ Presents user's preference on $(UPc_i \mid category, Adc_j \mid category)$ combination. $a_{ij}^1$ denotes the number of choice "Like", $a_{ij}^d$ denotes the number of choice "Dislike", $h_{ij}$ stores the history of like or dislike that user selected for a certain time.. $UPc_n$ denotes user profile category, $Adc_m$ denotes advertisement category.

$a_{ij} = (a_{kj}^1, a_{kj}^d, h_{kj}) (1 \leq i \leq k, 1 \leq j \leq m)$ Presents user's preference on $(USc_r \mid category, Adc_j \mid category)$ combination. $USc_k$ denotes user scene category, $Adc_m$ denotes advertisement category.

*Fig 11c*

User Feedback

|  | $VSc_1$ | $Adc_1$ | 1 |
|---|---|---|---|
| 1 | $VSc_2$ | $Adc_5$ | 0 |
| 2 | $VSc_4$ | $Adc_3$ | -1 |
| 3 | ... | ... | ... |
| ... | $VSc_n$ | $Adc_m$ | ... |
| N |  |  |  |

User Feedback is several three-tuples<VSc, ADc, Pref>, VSc is video segment category, ADc is advertisement category, Pref is chosen from 0, 1 and -1, which denotes whether the user like, dislike or no opinion about the combination of video segment and advertisement.

*Fig. 11d*

Construction of Bayesian model.
*The formula of user feedback (Category of Video segment, Category of Advertisement, Preference )*

Bayesian (Video Segment, Advertisement):Pr /*calculate the preference probability of a certain video segment and advertisement combination*/

1. Nodes: V denotes Video Segment, Ads denotes Advertisement and Pref denotes User preference(Like or Dislike) and the tables defined in step2 is constructed temporally when Bayesian model works.
2. Three probability distribution tables:

V-Ads table (P(Ads |V )) denote the probability to choose the Ads when specific video segment is selected. This parameter can be calculated according to the amount of financial support;
    Set there are n Ads in the candidate set of a video segment, and the financial sponsor can be listed as
    $(f_1, f_2, \ldots, f_n)$ which is also the head of V-Ads table, so the kth ads's conditional probability can be calculated using $f_k / \sum_{i=1}^{n} f_i$.

Pref-V-Ads table (P(Pref |Ads,V )) denote the probability that user prefer the video segment and advertisement combination. This parameter can be calculated according to the feedback from user;
    The head of table Pref-V-Ads is (video segment, advertisement, like, dislike ), and the conditional probability can be calculated by $$P(Pref | Ads, V) = \frac{a_{ij}^l}{a_{ij}^l + a_{ij}^d}$$ using the data of user preference matrix.

V table (P(V)) denotes the probability that a certain video segment was displayed according to the history. We can get this probability from some famous video website.
    Calculate the probability $P(V, Ads, Pref) = P(Pref | Ads, V) \cdot P(Ads | V) \cdot P(V)$
    using Bayesian formula.

After the model is constructed, we can predict the user preference probability $$P(Ads, Pref | V) = \frac{P(Ads, V, Pref)}{P(V)}$$ (Given the category of Video segment, the conditional probability that certain kind of advertisement is preferred by customer) from the model and some Advertisements will be filtered according to the output of this model.

*Fig. 16*

Bayesian Filtering Algorithm

/*Parameter definition:
P0: The probability threshold. If preference value is lower than it, then the video segment and advertisement combination is considered not probably preferred by customer, else it will be accepted.
Bayesian (Video Segment, Advertisement):Pr: This function defined in the first step
P1 (Candidate Advertisements, Personal information): Advertisement: This function will choose suitable advertisements from the output advertisements of Bayesian model according to customer's personal information.
--------------------------------------------------------------------------------------------
-------------------------------*/
Begin   /*Filter algorithm*/
For every video segment in the Original Ads_Play_Table do
  If Bayesian(Video Segment, Advertisement)<P0 then remove it from Original Ads_Play_Table   else
    If ( the length of advertisement is longer than accordingly video segment) then
        Remove it from Original Ads_Play_Table;
      /*filter the advertisement from original Ads_Play_Table according to the User
          preference model and time   restriction, output the filtered advertisement
          set*/
    P1(filtered advertisement set, personal information);
    /*help customer to choose suitable advertisements from the output of Bayesian
          model according to the personal information provided*/
  End For
  After this loop, the Filtered Ads_Play_Table is constructed, and User device can play the advertisement accordingly.
End Begin

*Fig. 17*

Bayesian Model Updating Algorithm

Begin /*Update the preference model*/

Feedback← Give Survey to customer after the whole video was played;

Updated user preference model← Update the probability distribution table;

Pref-V-Ads table (P(Pref|Ads,V)) and V table (P(V)) using the feedback;

When a new Original Ads_Play_Table comes, it will be handled by new preference model;

End Begin

*Fig. 18*

SYSTEM AND METHOD FOR MATCHING TARGETED ADVERTISEMENTS FOR VIDEO CONTENT DELIVERY

CROSS-REFERENCE TO RELATED APPLICATIONS

This patent application claims priority to U.S. Provisional Application No. 61/299,223 filed on Jan. 28, 2010, entitled "System and Method for Target Advertisement," which application is incorporated by reference herein in its entirety. This patent application further relates to the following co-pending and commonly assigned U.S. patent applications: Ser. No. 12/958,072, filed on Dec. 1, 2010 entitled "System and Method for Targeted Advertisements for Video Content Delivery," and Ser. No. 12/957,972, filed on Dec. 1, 2010 entitled "System and Method for Filtering Targeted Advertisements for Video Content Delivery," which applications are hereby incorporated herein by reference in their entirety.

TECHNICAL FIELD

The present invention relates generally to data communication systems, and more particularly to a system and method for matching targeted advertisements for video content delivery.

BACKGROUND

As video content delivery has progressed from a mass broadcast model to a more personalized narrowcast model, the modes and methods of advertising has changed accordingly. In the past, advertisers had to rely on demographic studies to determine the makeup of their advertising audience before committing large sums of money to mass broadcast and print advertising.

Already, advertisers can target their desired demographic on the web by placing ads according to user search terms and web browsing history. For example, if a user performs a search for "luxury automobiles" on a web-based search engine, the search engine will often return advertisements from luxury automobile manufactures and dealers.

With respect to video programming, some resources exist for targeted advertising also exists. As television channels and programming becomes more localized, advertisers can target their potential demographic based on program content. For example, an advertisement for a local automobile dealer can be inserted in a cable television show about automobiles at a local CATV head end. Furthermore, video-on-demand (VOD) services available at the set-top box from cable and telephony service providers, and video services available directly on the Internet, have brought with it the possibility for advertisers to directly target their desired demographic using targeted advertisements for video content. According to some market studies, targeted advertisements will account for between 40% and 60% of the total revenue for Internet protocol television (IPTV) and other Internet based video services.

SUMMARY OF THE INVENTION

In accordance with an embodiment, a method of matching video content to advertising content includes electronically receiving a video content metadata from a content provider, and matching the video content metadata to advertising content metadata of a global list of advertisements. The video content metadata corresponds to video content being sent to a user device and includes at least one keyword. Furthermore, the advertising content metadata corresponds to advertising content and includes at least one keyword. Matching the video content metadata to advertising content metadata includes comparing the at least one keyword of the video content metadata to the at least one keyword of the advertising content metadata.

In accordance with a further embodiment, a method of matching video content to advertising content includes electronically receiving video content metadata from a content provider, matching the video content metadata to advertising content metadata of a global list of advertisements, and generating a first list of advertisements based on the matching. The video content metadata corresponds to video content being sent to a user device, and the advertising content metadata corresponds to advertising content. In an embodiment, the video content metadata includes a first category taken from an ontological structure, and the advertising content metadata includes a second category taken from the ontological structure. Matching the video content metadata to the advertising content metadata further includes comparing the first category to the second category.

In accordance with a further embodiment, a system for matching video content to advertising content includes a metadata matcher matching video content metadata to advertising content metadata of a global list of advertisements. The metadata matcher matches the video content metadata to advertising content metadata by comparing at least one keyword of the video content metadata to at least one keyword of the advertising content metadata. In an embodiment, the advertising content metadata corresponds to the advertising content, and the video content metadata corresponds to the video content.

In accordance with a further embodiment, a non-transitory computer readable medium has an executable program stored thereon. The program instructs a microprocessor to match video content metadata to advertising content metadata of a global list of advertisements. In an embodiment, the video content metadata corresponds to video content and includes at least one keyword. Furthermore, the advertising content metadata comprises at least one keyword. The step of matching the video content metadata to advertising content metadata includes comparing the at least one keyword of the video content metadata to the at least one keyword of the advertising content metadata.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 11a-11d illustrate embodiment table and matrix structures;

FIG. 16 illustrates an embodiment Bayesian network construction algorithm;

FIG. 17 illustrates an embodiment Bayesian filtering algorithm;

FIG. 18 illustrates an embodiment Bayesian model updating algorithm; and

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method for inserting advertisements into video content. Embodiments of the invention may also be applied to other applications that require advertising insertion or applications that match content to user preferences or profiles.

Embodiments of the invention address providing content based target advertisement capability. In some embodiments, it is assumed that metadata relating to both the video/IPTV program and advertisements are available or generated using metadata techniques known in the art.

Embodiments of the present invention match advertisement to video content and/or IPTV programming. Some embodiments further customize advertisement matching by learning user's preference, profile and scene information. Such user profile information can include categories and ontology that include user internal information such as age and gender, user external information such as family status, occupation, education, and user scene information such as whether the user is with his or her family or alone at home, on a vacation or on a business trip. Embodiments assume that, at some point, the user's profile information will affect a user's preference for particular types of video content and video content/advertisement combinations. For example, if a user is on vacation with his family, the user may be more receptive advertisements directed toward restaurants, attractions and discounts than toward more business related advertisements, such as advertisements directed toward business staffing firms. On the other hand, if a user is on a business trip, the user may be more receptive to business staffing firm advertisements.

Besides user scene information, embodiments use information like age, gender, family status, occupation and education to initializing a new user preference matrix. In some embodiments, such an initialization accelerates the learning process of user preference, and provides better selection of advertisements for viewers.

Figure 1:
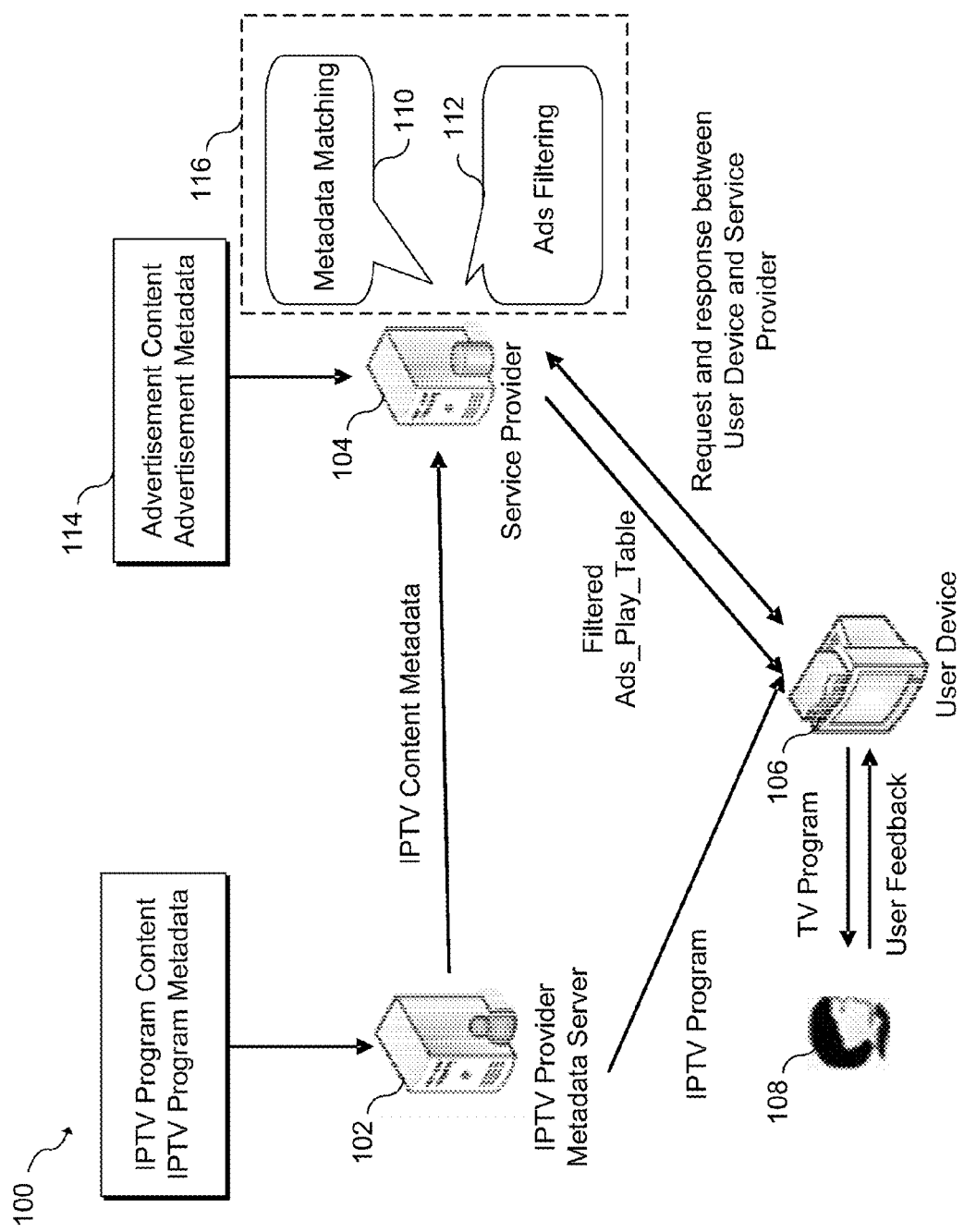
FIG. 1 illustrates an embodiment video transmission and advertisement insertion system.

FIG. 1 illustrates IPTV transmission system 100 according to an embodiment of the present invention, which includes IPTV provider and metadata server 102, service provider 104 and user device 106. User device 106 provides video content and advertising content for user 108. IPTV Provider 102 provides video programming to user device 106 and video content metadata that described the video programming to service provider 104. In one embodiment, the metadata description is in a TV Anytime format, which is a format developed by the TV Anytime Forum. Alternatively, other metadata formats can be used, for example, MPEG-7 and MPEG-21. In embodiments, the video programming sent to user device 106 can be in any video format, such as an MPG, or an AVI format. In an embodiment, service provider 104 provides advertisements and advertisement metadata associated with the advertisements to user device 106. Alternatively, user device 106 can receive advertisements from another source.

In a further embodiment, service provider 104 has advertising provider 114 and advertising matching service 116. Advertising provider 114 provides advertisement content and advertisement metadata, and advertising matching service 116 provides computation capability regarding advertisement metadata. In one embodiment, advertising matching service 116 includes metadata matching block 110 and ads filtering block 112. In one embodiment, metadata matching block 110 matches advertisement metadata to advertising metadata and ads filtering block 112 filters the matched metadata according to a user preference model. For example, matching service 116 selects related advertisements for given IPTV program via metadata matching algorithm and generates a global ad play table. Matching service 116 then filters the global ad play table based on user preference data.

In an embodiment, service provider 104 also provides computation capability to match metadata associated with advertisements with metadata associated with video programming, and filter the matched metadata according to a user profile. In an embodiment, advertisement metadata is generated based on an embodiment advertisement metadata schema. In alternative embodiments, the service provider can receive advertising metadata from another source or service. In further embodiments, the processor for matching metadata can be separate from the computing resources that store, process and transmit the actual advertising content. Furthermore, the computation resources or server that performs metadata matching 110 can be separate from the computation resources or server that performs ads filtering 112.

In an embodiment, user device 106 receives video programming from IPTV provider 102 and a list of filtered advertisements from service provider 104. In some embodiments, user device 106 further provides requests, such as IPTV requests, and feedback data from user 108 with respect to the provided advertisements. In an embodiment, user device 106 includes video reception equipment such as, but not limited to a computer, a high-definition television (HDTV), a set-top box, a hand-held video device, and the like.

Figure 2:
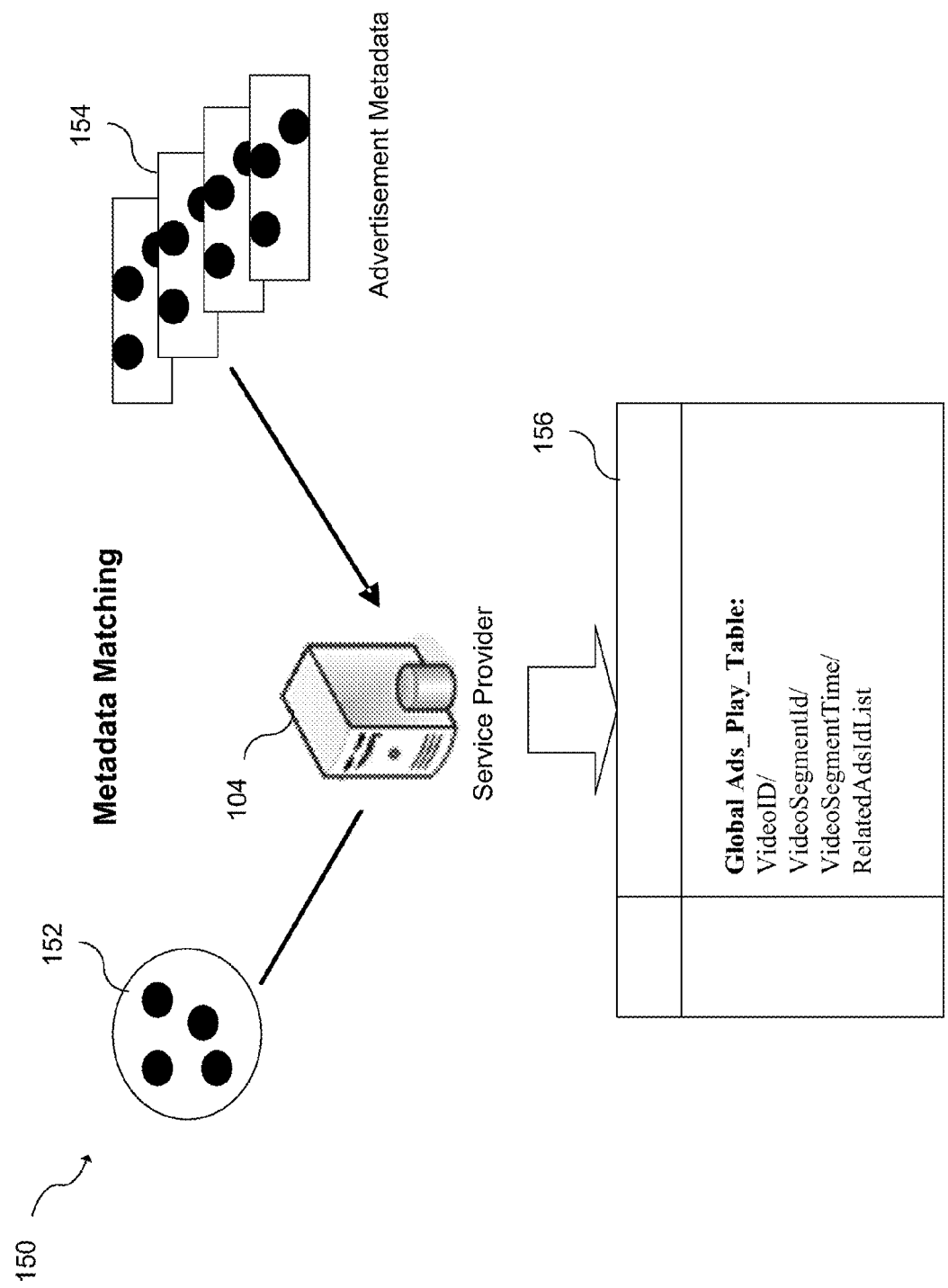
FIG. 2 illustrates an embodiment metadata matching system.

FIG. 2 illustrates a block diagram of embodiment metadata matching function 150. In an embodiment, a matching function selects content related advertisements using advertisement metadata 154 against given IPTV or video program using IPTV or video program metadata 152 to generate Global Ads_Play_Table 156. Global Ads_Play_Table includes fields such as VideoId, VideoSegmentId, VideoSegmentTime, RelatedAdsIdList. In further embodiments greater, fewer or different fields can be used. In one embodiment, VideoID represents an ID of a video, VideoSegmentId represents an ID of a video segment in the video, VideoSegmentTime represents the time stamp of the video segment, and RelatedAdsList represents a list of Ads related to the video.

Figure 3:
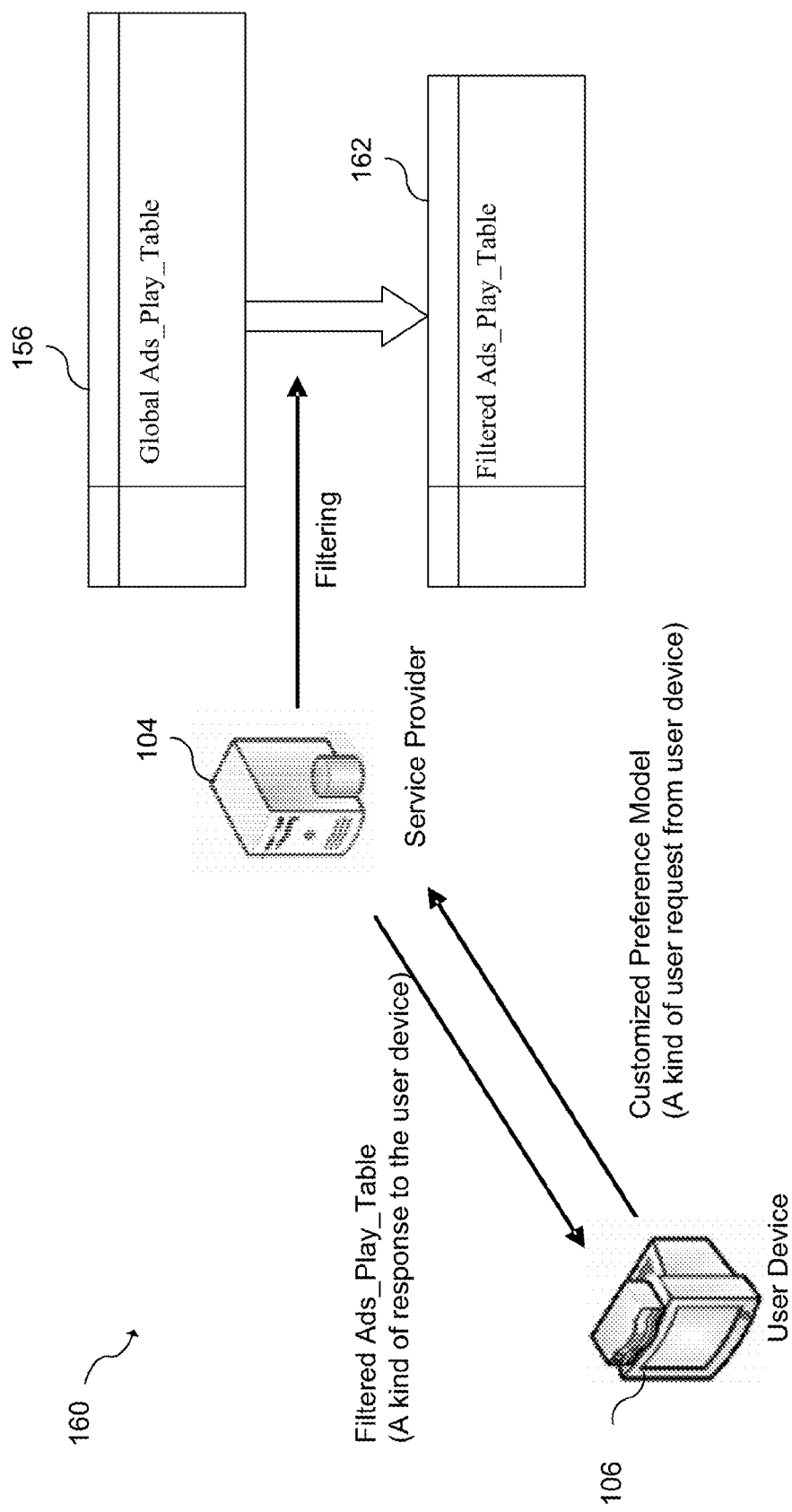
FIG. 3 illustrates an embodiment advertisement filtering system.

FIG. 3 illustrates block diagram of embodiment filtering block 160, which filters Global Ads_Play_Table 156 according to a user preference data to produce Filtered Ads_Play_Table 162. In an embodiment, Filtered_Ads_Play_Table 162 describes a subset of Global Ads_Play_Table that most closely matched the user preference data. In an embodiment, service provider 104 sends Filtered_Ads_Play_Table to user device 106 to specify which ads are inserted into the video content played by user device 106. In addition, in some embodiments, user device 106 provides user profile and/or user preference data to service provider 104 for use in ad filtering. In some embodiments, the user's preference data can be learned or can be manually specified by the user device, for example, with help of user's feedback.

Figure 4:
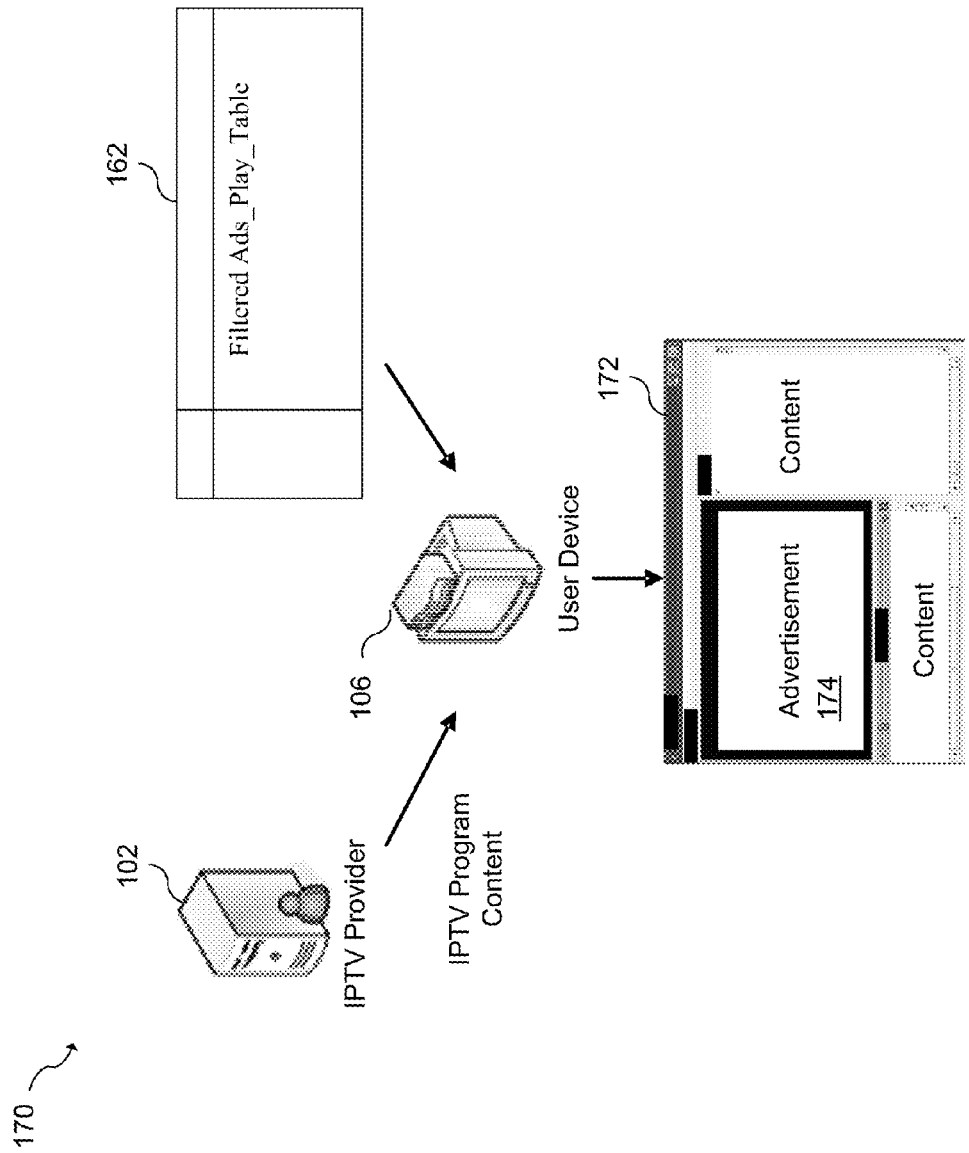
FIG. 4 illustrates an embodiment advertisement insertion system.
Figure 5:
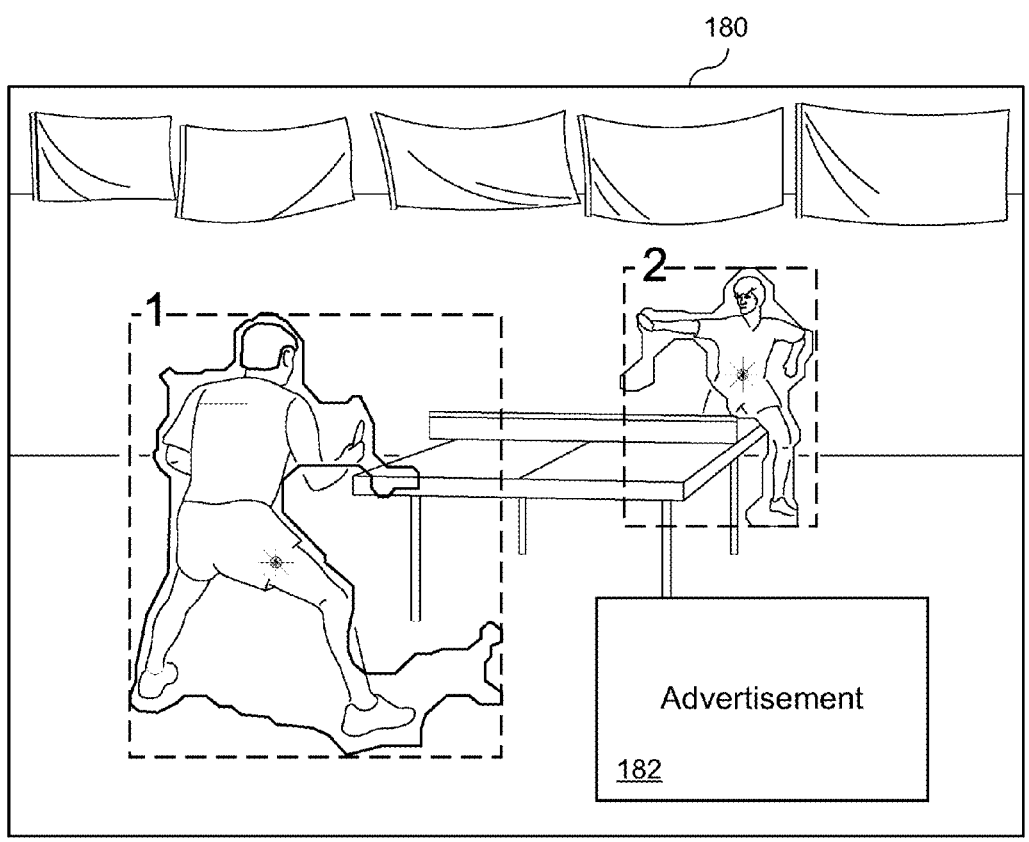
FIG. 5 illustrates an embodiment advertisement insertion example.

FIG. 4 illustrates a block diagram illustrating embodiment ad insertion method 170. After user device 106 receives Filtered Ads_Play_Table 162, and video content from IPTV provider 102, user device 106 inserts 174 within content 172. In one embodiment, Filtered Ads_Play_Table is used by user device 106 to pop up advertisements that play during playing the IPTV program by using advertisement locating information. For example, FIG. 5 illustrates video content 180 having advertisement 182 inserted in the lower right hand corner. In an embodiment, advertising locating information is information for locating the advertisements in a video or a video frame.

Figure 6:
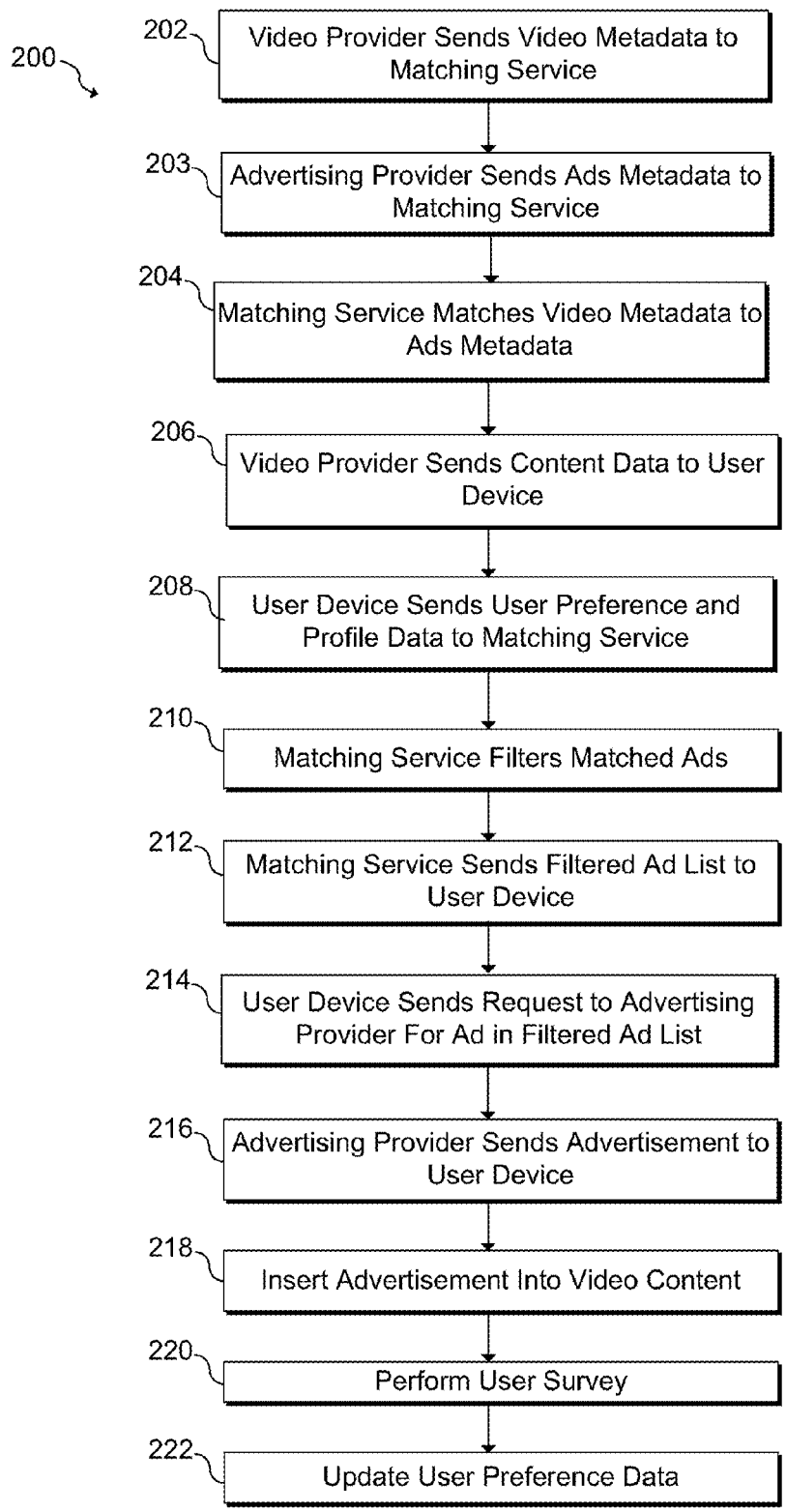
FIG. 6 illustrates a flow chart of an embodiment advertisement determination and insertion method.

FIG. 6 illustrates a block diagram of embodiment ad insertion method 200. In Step 202, the video program provider sends video program Program's Metadata (IPTV Metadata) to the matching service. In an embodiment, the video program provider is an IPTV provider. Alternatively, other types of video providers, such as Web TV service providers, can be used. In step 203, the advertising provider sends the advertisement metadata to the matching service. In some embodiments, steps 202 and 203 are performed at the same time.

In step 204, the matching service uses the video metadata to search against the Ads metadata based on several similarity criteria to generate the Global Ads_Play_Table. In one embodiment, two separate two kinds of similarities are used: global similarity and local or shot similarity. Global similarity means that the chosen ads metadata matches the video metadata in a global level. For example, the leading role of the video content is the same person as the role in the advertisement, or the topics of the video content and the advertisement content are similar (i.e. about Christmas). Local similarity means that matched Ads Metadata matches the video Metadata in one segment. For example, one segment of the video content is related to or shows a particular location of a chain of home products stores, and advertisement for the chain of home products stores can be matched with the corresponding video segment. In some embodiments, advertisements selected based on local similarity are assigned a particular "popup-time" based on the length of the video shot. For advertisements based on global similarity, however, a "popup-time" is not defined, and can be decided by other factors in some embodiments. Alternatively, a "popup-time can also be defined from advertisements based on global similarity.

In step 206, the matching service sends video content data to the user device. For example, when a user watches a video program, the video program provider sends the video program content data as well as metadata that describe the video content to the consumer's user device. In step 208, the user device sends the user's preference and profile data to the matching service. In some embodiments, steps 206 and 208 can be performed at the same time.

In step 210, the matching service filters the matched advertisement list according to the user's preference and profile data. In one embodiment, the user preference data is used to filter out advertisements from the Global Ads_Play_Table to generate a Filtered Ads_Play_Table. In one embodiment, the removed advertisements are those matching a low user interest according to the user preference and profile data. In some embodiments, the advertisements corresponding to a high user preference are retained. In one embodiment, the Global Ads_Play_Table is saved at the server side to be used by other consumers, and the Filtered Ads_Play_Table is transmitted to the user to the consumer's user device to help play the advertisements in step 212.

In step 214, based on the returned Filtered Ads_Play_Table, the consumer's user device sends a request to the advertising provider to retrieve advertisements. In an embodiment, these advertisements are played based on the time slots specified in the Filtered Ads_Play_Table. In step 216, the advertising provider sends the advertisements to the user device in response to the request. In step 218, the advertisements are inserted with the video content on the user device. In some embodiments, the advertisements are displayed using different ads insertion schemes. In some embodiments, the insertion schemes selected are those that maximize user experience, according to user feedback as well as the advertiser's monetary goals. For example, the ads can be put on the bottom of a video frame or can be inserted as whole frames after video frames.

In step 220, a survey regarding the advertisements that were played in the video content is displayed on the user device when the video program is completed in some embodiments. Alternatively, the user survey is display at other times, for example, after several videos are viewed. Here, the user provides feedback about the combinations of the video and advertisements. In step 222, an embodiment learning mechanism updates the user's preference data based on the feedback. In one embodiment, the feedback is in the format of a list of Ads_Feedback_Tuple, in which each entry of Ads_Feedback_Tuple includes three feedback elements: int shotId, int AdsId, and enum remark. In an embodiment, int shotId represents the ID of a shot, int AdsId represents the ID of ad segment, and enum remark represents a certain number for indicating preferences. Alternatively, other feedback fields can be used, for example, a field specifying a user's location.

Figure 7:
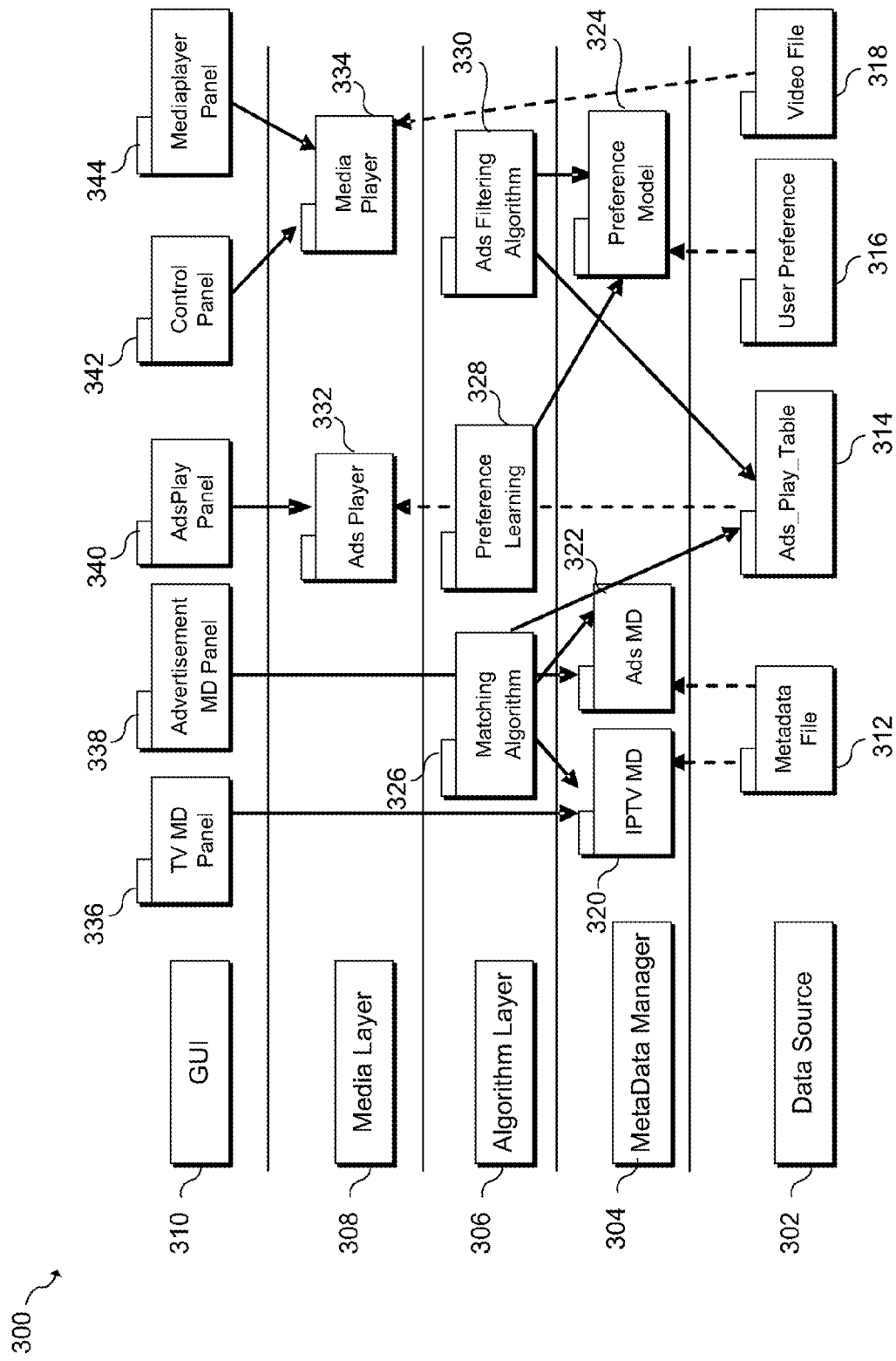
FIG. 7 illustrates an embodiment 5-layer advertisement determination system structure.

FIG. 7 illustrates embodiment 5-layer systems structure 300. The first layer is data source layer 302 that includes metadata file 312, ads_play_table 314, user preference data 316 and video file 318. Metadata manager layer 304 performs the function of storing and managing metadata, and includes IPTV metadata 320, ads metadata 322 and preference model 324. Algorithm layer 306 includes matching algorithm 326, preference learning 328 and ads filtering algorithm 330. Media layer 308 includes ads player 332 and media player 334. Finally, graphical user interface (GUI) 310 includes TV MD panel 336 that shows the video metadata, advertisement MD panel 338 that shows the ad metadata, adsPlay panel 340 that plays the ad segment, control panel 342 that performs certain control functions, such as stop or fast forward, and mediaplayer panel 344 that plays the video.

In an embodiment, matching algorithm 326 finds matches between IPTV metadata 320 and Ads metadata 322. This module deals with metadata matching in order to find content related advertisements in a metadata level. In one embodiment, the input is a TV metadata segment that describes TV content, and a list of advertisement metadata segments that describes the advertisements. Alternatively, other objects and formats can be used. In an embodiment, advertising matching can be specified as having a first input as a video segment metadata instance (VIDEO_METADATA) and a second input as an advertisement metadata instance (ADS_METADATA).

In an embodiment, a preference and profile (PNP) model is used as a filtering mechanism. Here the "Global Ads_Play_Table" initially includes all content related advertisements for one particular video segment, then in a next step; some PNP-irrelevant advertisements (i.e. the ads that are not relevant to the video content and user PNPs) are filtered out by the preference matrix. From this filtering mechanism, in one embodiment, the "Global Ads_Play_Table" initially includes all possible content related advertisements for one particular video segment. Alternatively, the Global Ads_Play_Table can be initialized with a smaller set of initial advertisements depending on the system and its specifications.

In an embodiment, both the video metadata and the advertisement metadata have a keyword and synopsis description, and two methods are used to match advertisements to one scene or shot. A first matching method is keyword matching in which a keyword in the video content metadata is matched with a keywords in the advertisement metadata. In one example, given a video segment instance (Video.VIDEO_METADATA) and an advertisement pool in which each advertisement has metadata (Ads.ADS_METADATA), keywords are matched according to the following pseudo code:

```
VideoKeywordList = getVideoKeywords(Video.VIDEO_METADATA);
Foreach Ads in Advertisement_Pool:
    AdsKeywordList=getAdsKeywords(Ads.ADS_METADATA);
    Foreach keyword in AdsKeywordList:
        If VideoKeywordList.contains(keyword):
            Associate(Video.VIDEO_METADATA, Ads);
            Break.
```

The functions getVideoKeywords and getAdsKeywords extract keywords from the video segment metadata file and advertisement metadata file by analyzing related nodes (for example "tva:Synopsis", "tva:Keyword", "AdvertisementKeyword" and "AdvertisementCategory"). Here, tva:Synopsis is a synopsis of the video content that may contain a phrase and/or one or more sentences, tva:Keyword is a keyword that corresponds to the video content, AdvertisementKeyword is a keyword that corresponds to advertising content and AdvertisementCategory is a category corresponding to the advertising content.

In an embodiment, an ontological matching strategy is used to match the video metadata to the advertising metadata. Using an ontological matching strategy reduces noise and the possibility of mismatch. For example, when using a synopsis having a value of one more sentences, an ontological strategy can help identify pertinent keywords. In an embodiment, ontological strategy singular and plural words are treated as similar keywords. For example, the word "family" and "families" are treated as the same keyword in one embodiment. Furthermore, in one embodiment, morphological similar words are treated similarly, for example, the words "politics" and "politician" are treated as the same keyword in one embodiment. In one embodiment, synonyms are treated are the same keyword. Furthermore, if a the matching criteria are further relaxed, word pairs such as "dog and cat" and "theater and bar" are treated as the same keyword. In one embodiment, the ontological matching strategy is implemented using a lexical database, for example, a WordNet database, also known as WordNet Boost.

In one Synopsis matching embodiment, the matching algorithm is based on a on the tva:Keyword of video shot metadata and the AdvertisementKeyword of advertisement metadata. In a further embodiment, the matching algorithm also uses the tva:Synopsis of the video shot metadata or the AdvertisementDescription of the advertisement or both fields. Furthermore, a natural language processing method can be used to find key grammar functional units within a description sentence of tva:Synopsis and AdvertisementDescription. After these grammar functional units are found, for example, by using existing grammar parsing software tools, another keyword matching between the key grammar functional units are performed to find matching pairs of video shot metadata and advertisement metadata.

In an embodiment, video content and advertising content is categorized according to embodiment ontological techniques, using for example, Upper Ontology to ensure that the video content metadata and the advertising metadata are covered by one or several categories. In some embodiments, once the categories are established, no further changes are made to the defined categories. Alternatively, a flexible categorization scheme can be used in which categories are updateable.

Figure 8:
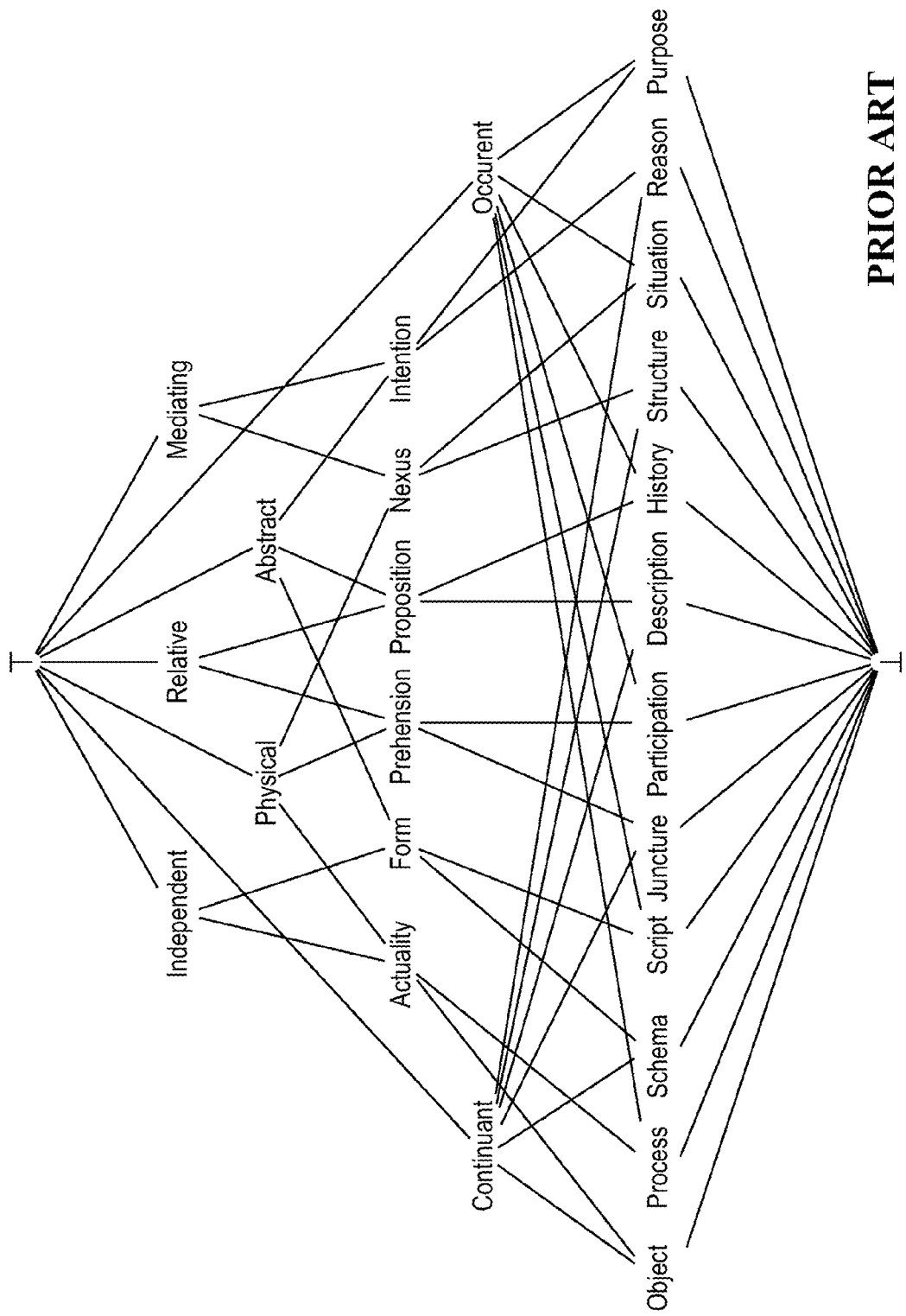
FIG. 8 illustrates an ontological structure according to the prior art.

FIG. 8 illustrates a hierarchy of top-level categories according to the book, *Knowledge Representation: Logical, Philosophical, and Computational Foundations*, by John F. Sowa, Brooks Cole (Pacific Grove, Calif., 2000) and described at http://www.jfsowa.com/ontology/toplevel.htm. In one embodiment, categories are derived by combining top levels of the FIG. 8 with Basic Formal Ontology (BFO), which was developed and formulated by Barry Smith and Pierre Grenon and described online at http://www.ifomis.org/bfo. In FIG. 8, the first level is Things, which includes everything in the world. The category of Things is further divided into 7 Level 2 categories: Independent, Physical, Relative, Abstract, Mediating, Continuant and Occurrent. These seven Level 2 categories are further divided, through a middle level, to a level containing the Object category. These 12 categories are also referred to as central categories. Table 1 shows how the 12 central categories are derived come from the Level 2 categories according to *Knowledge Representation*.

TABLE 1

Matrix of the twelve central categories

| | Physical | | Abstract | |
| --- | --- | --- | --- | --- |
| | Continuant | Occurrent | Continuant | Occurrent |
| Independent | Object | Process | Schema | Script |
| Relative | Juncture | Participation | Description | History |
| Mediating | Structure | Situation | Reason | Purpose |

Figure 9A:
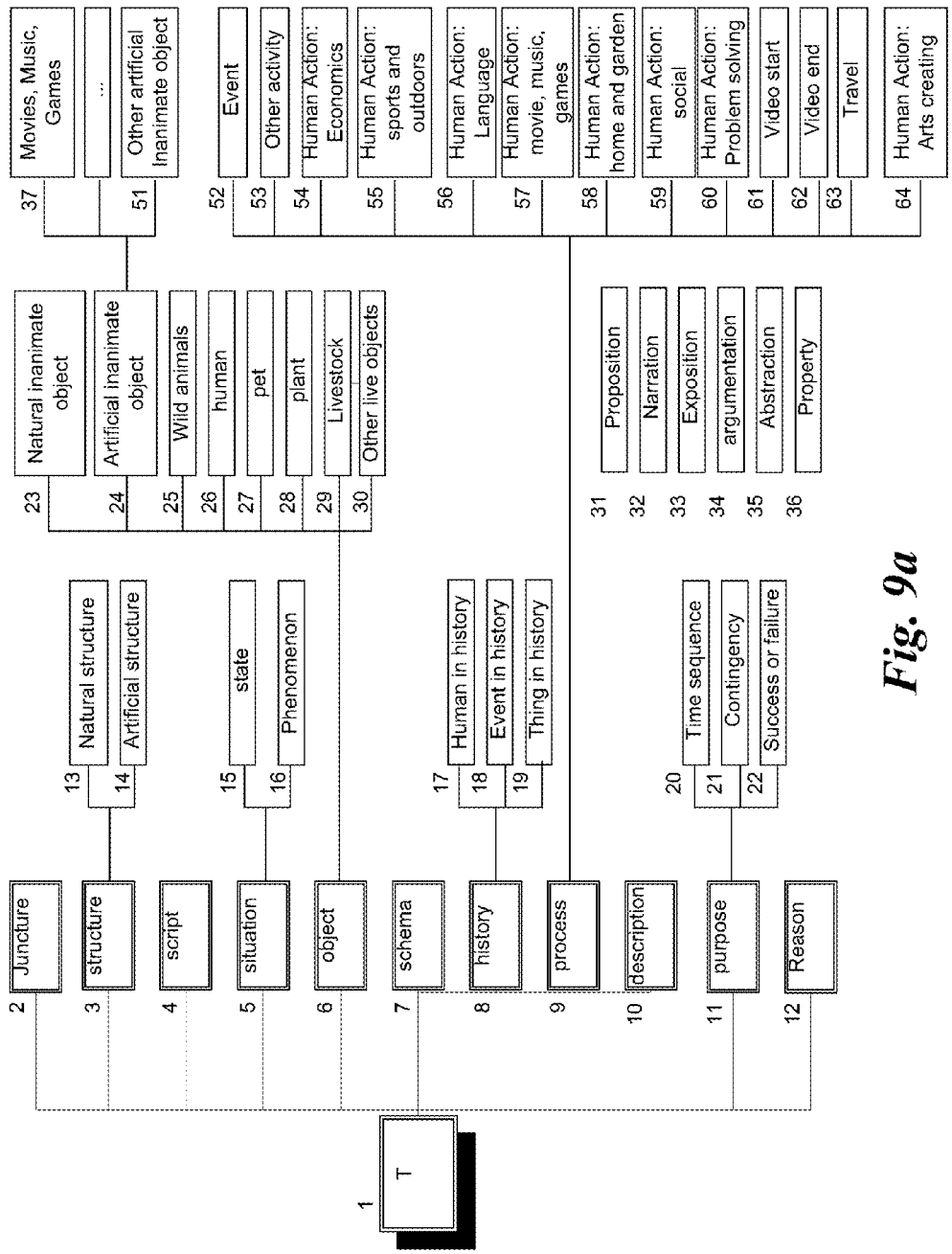
FIGS. 9a and 9b illustrate an embodiment category structure.
Figure 9B:
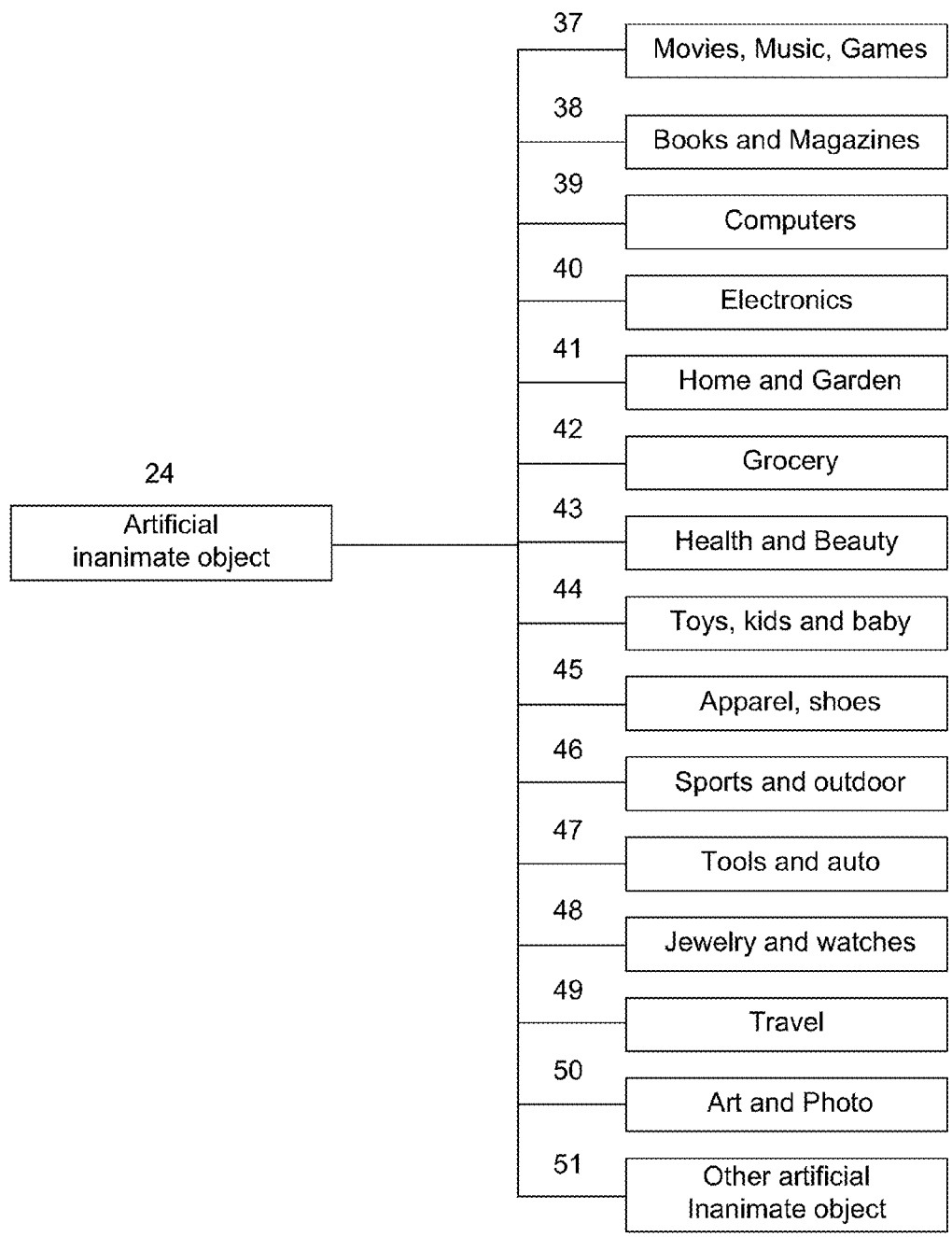

In an embodiment, these 12 central categories are adjusted to be suitable for video clip and advertisement categories. In particular, some of the twelve categories, for example, structure, situation, object, history, process, description and purpose are divided into subcategories. Other categories, in some embodiments, remain in their original form. Alternatively, different groupings categories can be subdivided depending on the particular application and its specifications. In one embodiment, the object and participation categories are combined because they have similar or the same sub-categories in video database. A description of one embodiment category structure is illustrated in FIGS. 9a and 9b. FIG. 9a illustrates the top-level categories juncture, structure, script, situation, object, schema, history, process, description, purpose and reason and their subcategories, if applicable. FIG. 9b illustrates further subcategories of "artificial inanimate object," which, itself, is a subcategory of the object category.

In an embodiment, the artificial inanimate object subcategory, as shown in FIG. 9b, includes a movie, music and games category that pertains to movies, video, music, television, games, and related objects and products. The books and magazine subcategory pertains to books, newspaper, magazine and digital publications, the computer subcategory pertains to, for example, computer hardware, software, pc games and peripheral devices, and the electronics subcategory includes, for example, consumer electronic devices such as cameras, televisions, and the like. The embodiment home and garden subcategory pertains to home and garden products, for example, furniture, and the grocery subcategory pertains to groceries such as food and wine. The embodiment health and beauty subcategory includes, for example, medicine, natural and organic foods, beauty products, and the embodiment, toys, children and baby subcategory covers toys and baby products including, but not limited to food and clothing. The embodiment apparel and shoes subcategory pertains to clothes shoes and accessories, for example, and the embodiment sports and outdoor subcategory pertains to, for example, sports products and products for outdoor activities.

In an embodiment, the tools and auto subcategory relates to objects such as power tools, hand tools, equipment, automobiles and related products. The embodiment jewelry and watch subcategory pertains to jewelry and watches, and the embodiment travel subcategory covers travel related objects such as hotels and travel products. The embodiment arts subcategory relates to art related objects such as painting and sculptures. Finally, the other artificial inanimate objects subcategory pertains to objects that do not fit into the artificial inanimate object categories described hereinabove.

In an embodiment, the juncture category describes a prehending entity that is an object in a stable relationship to some prehended entity during that interval. An example of a juncture is the relationship between two adjacent stones in an arch. In an embodiment, the structure category refers to that which mediates multiple objects whose junctures constitute the structure. In an embodiment, the structure category is divided into an artificial structure subcategory and a natural structure subcategory. The artificial subcategory describes, for example, human built structures, and the natural structure subcategory describes, for example, structures in nature.

In an embodiment, the script category describes an abstract form that represents time sequences. Such sequences can include, for example, a computer program, a recipe for baking a cake, a sheet of music to be played on a piano, or a differential equation that governs the evolution of a physical process. In an embodiment, the situation category describes something that occurs in a region of time and space. The situation category is subdivided into a state category and a phenomenon category. The state category describes a situation that does not change during a given period of time, and the phenomenon category describes a state or process known though the senses rather than by intuition or reasoning.

The embodiment object category, is an entity that retains its identity over some interval of time. Subcategories of the object category include natural inanimate object, artificial inanimate objects, wild animals, human, pets, plant and livestock. In an embodiment, the natural inanimate object category pertains to non-living physical entities such as a rock or a mountain. The Artificial inanimate object category pertains to a large number of further subcategories as described in FIGS. 9a and 9b. Artificial inanimate objects can include, for example, such objects as vehicles, desks and chairs. The wild animal subcategory includes animals in the wild such as tigers, lions, monkeys, and the like. In one embodiment, the Human subcategory includes human beings, and the pet subcategory includes domesticated or tamed animal kept as a companion. The plant subcategory includes members of the kingdom Plantae, and the livestock category includes, for example, horses, cattle, sheep, and other useful animals kept or raised, for example on a farm or a ranch.

In an embodiment, the schema category represents an abstract form whose structure does not specify time or time-like relationships. Examples include as geometric forms, the syntactic structures of sentences in some language, or the encodings of pictures in a multimedia system.

In an embodiment, the history category represents a proposition that relates some script to the stages of some occurrent, which is an entity that does not have a stable identity during any interval of time. Embodiment subcategories of the history category include human in history, event in history, and thing in history. The human in history subcategory describes people in history, the event in history subcategory describes a historic event, and the thing in history category describes, for example, an object in history.

In an embodiment, the process category represents a thing that makes a change during some period of time. Embodiment subcategories of the process category include event, human action—other activity, human action—economics, human action—sports and outdoors. human action—language, human action—movie, music and games, human action—home and garden, human action—social, problem solving, video start, video end, travel, and arts creating. The event subcategory describes, for example, a process that makes a change during a short period of time. In one embodiment, a very short period of time is about two seconds. Alternatively greater or lesser time periods can be considered a very short period of time depending on the environment and particular embodiment. The human action—other activity subcategory includes things that people do or people cause to happen. The human action—economics subcategory includes the science that deals with the production, distribution, and consumption of goods and services, or the material welfare of humankind. The human action—sports and outdoors subcategory includes sports and outdoor activities, for example, football games, baseball games, etc. The human action—language subcategory includes, for example, language related activities such as speaking and talking, and the human action—movie, music, games subcategory includes activities, such as, but not limited to watching movies and television, listening to music and playing video games.

In an embodiment, the human action—home and garden subcategory includes home and garden related activities such as housekeeping, and the human action—social subcategory includes social activities such as going to parties and other social gatherings. The embodiment problem solving subcategory includes a cognitive activity made by an agent for solving a problem.

In an embodiment, the video start subcategory denotes the starting of a video clip and the video end subcategory denotes the ending of a video clip. The embodiment travel subcategory pertains to travel, and the arts creating subcategory pertains to creating artistic objects.

In an embodiment, the description category is subdivided into the proposition, narration, exposition, description for argumentation, abstraction and property subcategories. The proposition subcategories include descriptions, and the narration subcategory includes, for example, reports, stories, biographies, etc. The embodiment exposition subcategory includes operational or locations plans such as a meeting agenda, and the description for argumentation subcategory includes arguments, issues, positions and facts. The abstraction subcategory pertains to a concept that abstracts some data, such as certain computer data structures, and the property subcategory pertains to descriptions of things. It should be appreciated that in alternative embodiments, different categories can be used. For example, a user defined category can be used to provide a more specific categorization.

In an embodiment, the purpose category pertains to an intention that explains a situation. Embodiment subcategories include time sequence, contingency, and success or failure. The time sequence subcategory describes sequences in time. For example, if an agent x performs an act y whose purpose is a situation z, the start of y occurs before the start of z. The contingency subcategory describes contingent purposes. For example, if an agent x performs an act y whose purpose is a situation z described by a proposition p, then it is possible that z might not occur or that p might not be true of z. Lastly, the success or failure subcategory purposes that result in success or failure. For example, if an agent x performs an act y whose purpose is a situation z described by a proposition p, then x is said to be successful if z occurs and p is true of z; otherwise, x is said to have failed.

In an embodiment, the reason category, unlike a simple description pertains to an entity in terms of an intention.

Figure 10A:
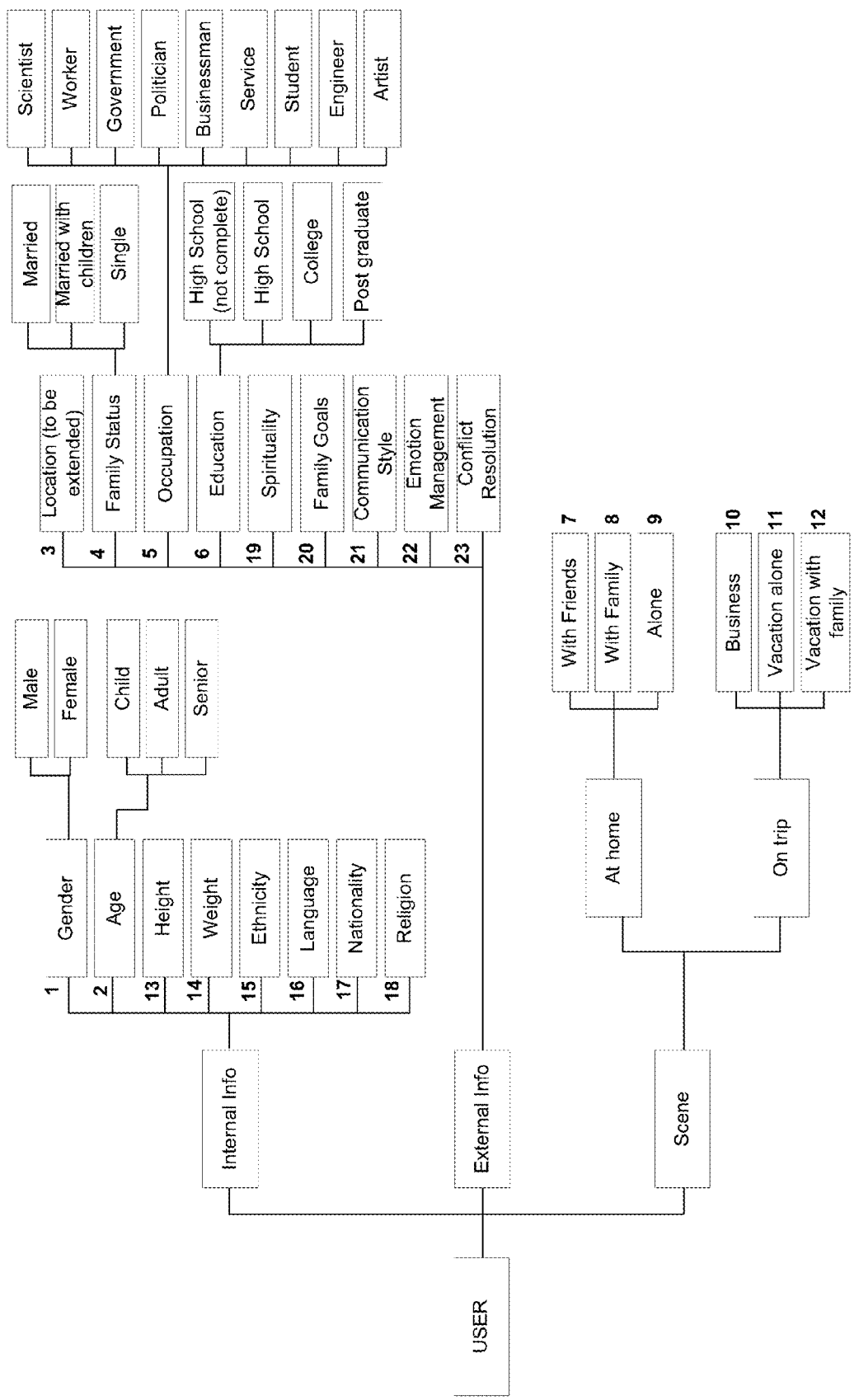
FIGS. 10a and 10b illustrates an embodiment user profile structure.
Figure 10B:
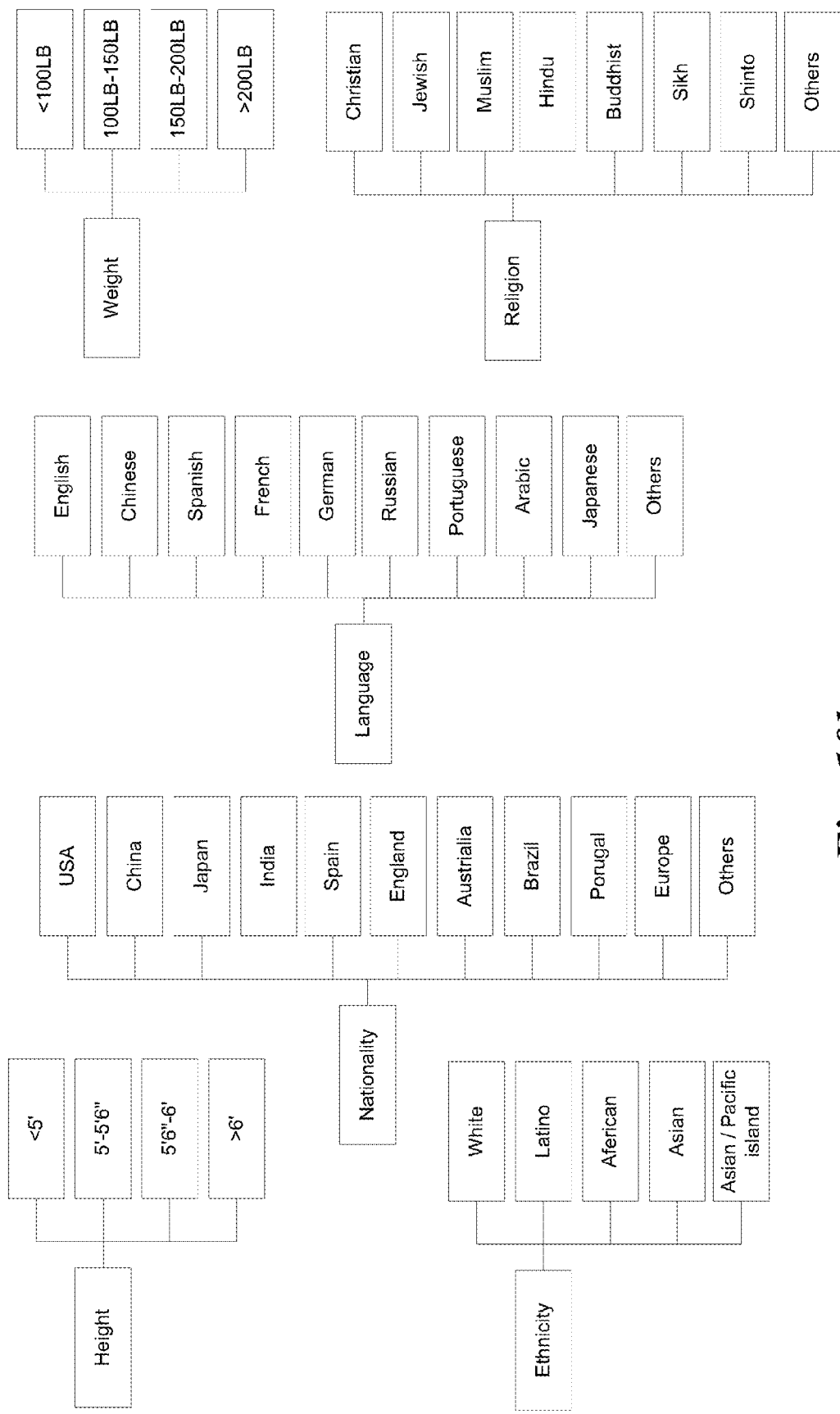

FIGS. 10a and 10b illustrate an embodiment ontological user profile structure. FIG. 10a illustrates an embodiment user profile having three major categories: internal attributes, external attributes and scene, and each of the three major categories have subcategories. In an embodiment, the internal information subcategory includes information that contains internal attributes of the user that can include gender, age, height, weight, ethnicity, language, nationality and religion. The external information category includes external attributes of the user that can include location, family status, occupation, education, spirituality, family goals, communication style, emotional management style, and conflict resolution style. The scene category includes information about a user's present activities such as being at home or on a trip.

FIG. 10b illustrates extensions to some of the subcategories shown in FIG. 10a. For example, the height, ethnicity, language, weight and religion subcategories are extended to provide ranges and classifications. It should be appreciated that in alternative embodiments, lesser or fewer categories and classifications can be used. Furthermore, the classifications can be modified, in some embodiments, to more directly address regional needs and differences. For example, in some embodiments that service regions with diverse dialects, the subcategories under the language subcategories can be modified to address different dialects. Other subcategories that can be similarly extended are, for example, the location, user scene subcategories, and external information subcategories 19 to 23. Furthermore, additional attributes can be added if necessary in some embodiments.

In one embodiment, attributes that are not used to assist with advertisement filtering are ignored in the user ontology, such as the user's name, address, phone number, and other privacy related attributes. Alternatively, these privacy related attributes can be stored in the ontological structure, for example, if the user gives authorization to use this information. In some embodiments, some address data can be used to assist with targeting advertisements to specific geographical locations.

FIGS. 11a-11d illustrate embodiment table and matrix structures used during operation of an embodiment system. FIG. 11a illustrates the structure of the Global Ads_Play_Table. Each column of the table is denoted by $VS_i$, which indicates the video segment to be played. Each column contains an ad identifier $Ads_{ij}$ that identified the specific ad and an accompanying category.

FIG. 11b illustrates an embodiment user preference matrix having n rows denoted by video segment category $VSc_i$ and m columns denoted by advertising category $Ads_j$. Each element $a_{ij}$ in the user preference matrix is a vector containing like value $a_{ij}^l$, dislike value $a_{ij}^d$ and history field $h_{ij}$. In an embodiment ($1 \le i \le n, 1 \le j \le m$), where n is the number of rows and m is the number of columns of the user preference matrix. In an embodiment, segment category $VSc_i$ and advertising category $Ads_j$ correspond to embodiment ontological categories described hereinabove.

FIG. 11c illustrates an embodiment user profile matrix that is divided into two portions. The first portion of the user profile matrix has n rows denoted by user profile items $UPC_i$. In one embodiment, these user profile items correspond to the ontological user profile categories described hereinabove. The user profile matrix has m columns denoted by advertising category $Ads_j$. Each element in the first part of the user profile matrix is denoted by $a_{ij}$ contains user preference data on each ($UPc_i$|category, $Adc_j$|category) combination. Element $a_{ij}^l$ denotes a number of choice "like" choices, $a_{ij}^d$ denotes a number of "dislike" choices, and $h_{ij}$ stores a history of like or dislike based on user feedback. In an embodiment, this history is kept for a certain period of time or over a certain number of user feedback events.

The second portion of the user profile matrix has k rows denoted by video categories $USc_r$. In one embodiment these video categories correspond to the ontological video categories described hereinabove. Each element in the first part of the user profile matrix is denoted by $a_{ij}$ contains user preference data on each ($UPc_r$|category, $Adc_j$|category) combination. Element $a_{rj}^l$ denotes a number of choice "like" choices, $a_{rj}^d$ denotes a number of "dislike" choices, and $h_{rj}$ stores a history of like or dislike based on user feedback. In an embodiment, this history is also kept for a certain period of time or over a certain number of user feedback events.

FIG. 11c illustrates an embodiment user feedback matrix. In an embodiment, the user feedback matrix contains N rows and three columns. Each column contains video segment category VSc, advertisement category ADc, and a user preference value chosen from 0, 1, and −1. In one embodiment, −1 indicates a negative response, 1, indicates a positive response, and 0 indicates a default value and/or a neutral response. Alternatively, different feedback values can be used and/or feedback values with more granularity. In an embodiment, these user feedback values are derived from a user feedback survey, however, in alternative embodiments, these values can be derived by other means.

In an embodiment, the user preference matrix and user profile matrix are maintained for each person and/or each user. In one embodiment, the user preference matrix is used for storing this user's preference about the combinations of each video segment category and advertisement category, and the profile matrix is used for storing the user's profile and scene preference. Both matrices are updated by using the feedback from when video content is viewed. During the playing of the video, once a segment is reached, one or several rows are selected from the user preference matrix according to the categories of the current segment and sent to a Bayesian Engine. One or several columns are selected from the user profile matrix according to the categories of the current segment and a user scene category. In one embodiment, the user selects the scene category during login. The Bayesian Engine then uses the user profile to adjust the preference data from preference matrix by multiplying a weight that is decided by user profile matrix. Then the adjusted preference data is then used to compute the user preference value. Next, the ads filter uses this value to filter out unsuitable advertisements from the Global Ads_Play_Table. Once this step is done, one or more advertisements are selected base on other conditions, such as the priority of each advertisement, and those advertisements selected are sent to user device for insertion into the video content.

Figure 12:
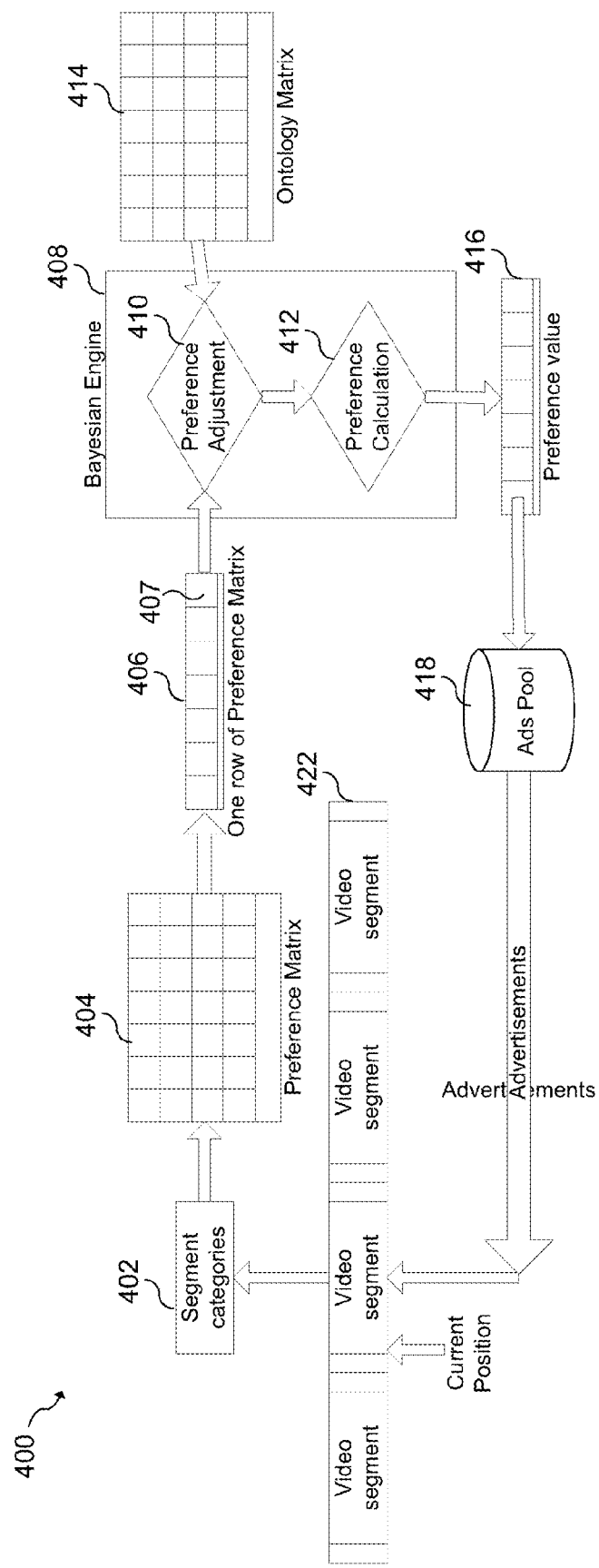
FIG. 12 illustrates an embodiment PNP update system.

FIG. 12 illustrates a block diagram showing an embodiment workflow of Bayesian Engine-based user preference and profile (PNP) update system 400. In an embodiment, system 400 is used for constructing and updating user preference matrix 404. Once a new video segment 422 with segment category information $VSc_i$ 402 arrives, preference data 406 from preference matrix 404 is selected according to the video category. Advertisement data is stored in Ads Pool 418. In addition, preference data from profile matrix 414 is selected. In a preference adjustment step, Bayesian Engine 408 performs preference adjustment 410 and adjusts a value pair in each cell 407 of selected preference data row 406 from preference matrix 404. In an embodiment, preference vales are adjusted by multiplying a weight value to either $a_{ij}^l$ or $a_{ij}^d$ of each preference value pair. In an embodiment, the weight is a number between −1 to 1, and is calculated by the selected data from profile matrix 414 by according to the following expression:

$$\text{Weight} = \frac{a_{ij}^l - a_{ij}^d}{(a_{ij}^l + 1)(a_{ij}^d + 1)}.$$

In one embodiment, profile weight factors from user profile matrix 414 are not used to adjust user preference value 416 directly to prevent user profile values from having too large an influence on user preference value 416. Therefore, in one embodiment, an average of 17 weight factors is used to adjust user preference value 416 once. Furthermore, the user scene category is also used to adjust the preference values one more time for a total of two adjustments are used for adjusting preference once itself for a total of two adjustments. Alternatively, a greater or fewer adjustments to the user preference value can be made depending on the system and its specifications. In an embodiment, if the weight is greater than 0, the adjustment is applied to $a_{ij}^l$, otherwise, the adjustment is applied to $a_{ij}^d$. The weight value is between −1 and 1, so that the adjustment has the form of $a_{ij}^l = a_{ij}^l * (1+\text{weight})$ if weight >0 or $a_{ij}^d = a_{ij}^d * (1-\text{weight})$ if weight <0.

In embodiment preference calculation step 412, Bayesian Engine 408 calculates preference value according to:

$$P = \frac{a_{ij}^l - a_{ij}^d}{(a_{ij}^l + 1)(a_{ij}^d + 1)}.$$

In one embodiment, the weight adjustment is applied before the calculation of preference value to ensure linearity of the preference value between −1 and 1. Alternatively, the weight adjustment can be applied after the preference value calculation and scaling applied afterward.

After the preference value of the combination of this video category and all possible advertisement categories $Adc_j \ldots Adc_j$ are calculated, and the advertisement category with the highest score $Adc_j$ is selected in an embodiment. Alternatively, lower scoring advertisement categories are omitted when forming Bayesian Engine 408 then chooses those advertisements in category $Adc_j$ from row $VSc_j$ of global Ads_play_table. After this filtering step, the rest of the advertisements are sent to user device for playing according to the advertisement related information such as priority, playing times etc.

In an embodiment, both the preference matrix and the user ontology or user preference matrix are updated according to user's feedback. If user's feedback indicates positive response, then the corresponding cell in preference matrix is updated according to $a_{ij}^l + 1$. In one embodiment, an entire column of the user profile category in the first section of the user profile matrix, and one cell of the corresponding scene category in the second section of the user profile matrix are updated with $a_{ij}^l + 1$. On the other hand, if the feedback is negative, the corresponding cells in the preference matrix are updated according to $a_{ij}^d + 1$, and the entire column of profile category plus one cell of corresponding scene category is updated according $a_{ij}^d + 1$. In an embodiment, the feedback is appended at the end of the array $h_{ij}$ in each corresponding cell. In alternative embodiments, update equation $a_{ij}^l + 1$ can be replaced by other update rules, for example, instead of incrementing by 1, it can be updated by incrementing with other specified constant or non-constant values. In some embodiments, some of the fields in the user profile are not used and/or not updated. Such unused fields, however, can be used and/or updated in a future version on of the system depending on the specific embodiment and its specifications.

Figure 13:
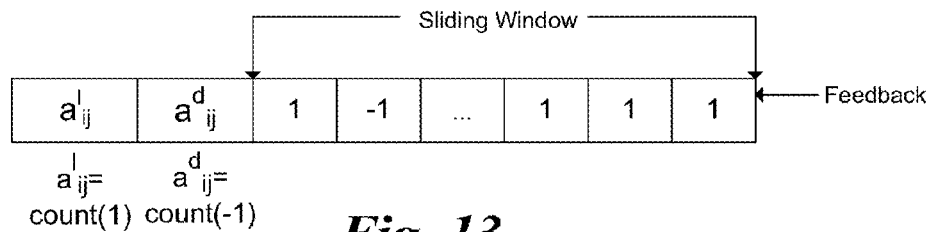
FIG. 13 illustrates an embodiment sliding history window.

In an embodiment, a sliding window is used to store the value of $a_{ij}^l$ and $a_{ij}^d$ in each cell. In some embodiments, the sliding window prevents new incoming feedback values from having a disproportionate affect on the calculation of the preference value, and prevents the values of $a_{ij}^l$ and $a_{ij}^d$ from having a high value due to accumulation. In an embodiment, each time a feedback value arrives, either a 1 or an −1 is appended to the first available cell in the sliding window. If the sliding window is full, the first element will be removed. By doing this, the total count in each cell of preference matrix and ontology-category matrix does note exceed a certain number. The structure of sliding window is shown in FIG. 13. Here, $a_{ij}^l$ and $a_{ij}^d$ track the number of 1 and −1 in the sliding window so that each time this cell is accessed. In some embodiments, the number of 1 and −1 do not need to be accounted in real-time, so each time a new feedback value arrives, either $a_{ij}^l$+1 is applied if the feedback value is 1, or $a_{ij}^d$+1 is applied if the feedback value is −1. If the sliding window is full, the leftmost element is removed, in one embodiment and either $a_{ij}^l$−1 or $a_{ij}^d$−1 applies depending on the removed values. In an embodiment, the window size also determines how much history is tracked for a particular video advertisement combination.

Figure 14:
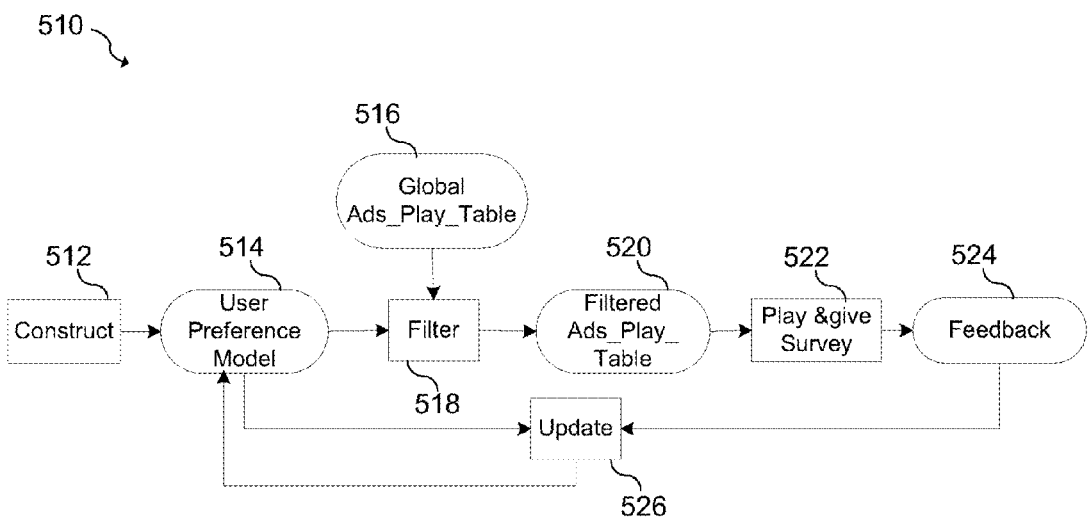
FIG. 14 illustrates an embodiment Bayesian network model.

FIG. 14 illustrates Bayesian network model 510 according to an embodiment of the present invention. In step 512, the Bayesian network is constructed and applied to user preference model 514. In step 518, Global Ads_Play_Table 516 is filtered according to user preference model 514 to produce Filtered Ads_Play_Table 520. In one embodiment, filtering operation 518 discards advertisements that are likely not preferred by the customer according to the output of the Bayesian model. Next, after the user views the video, a user survey is administered in step 522 to provide feedback 524. In one embodiment, survey step 522 is composed of playing video segment, an accompanying advertisement, and a preference choice. In an embodiment, the survey is given to a user or customer to capture their preference after the whole video is shown to the user or customer. The user preference model is updated according to feedback 524 in step 526.

Figure 15:
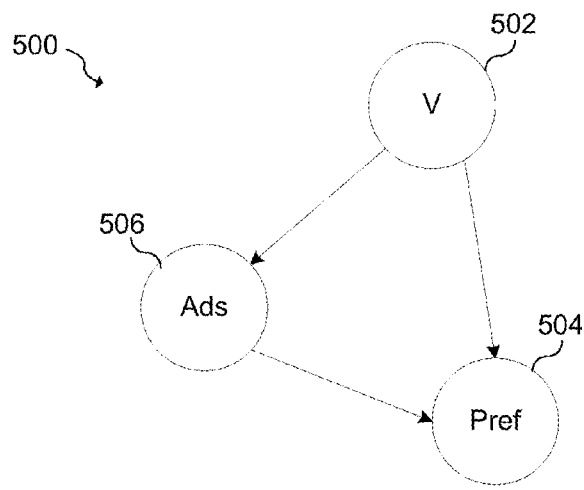
FIG. 15 illustrates a flow diagram of the construction of an embodiment Bayesian network.

FIG. 15 illustrates flow diagram 500 of the construction of an embodiment Bayesian network based on user preference model. In an embodiment, the Bayesian network calculates the preference probability of a certain video segment and advertisement combination. In an embodiment, three nodes are used. Node V 502 denotes a video segment, node Ads 506 denotes an Advertisement and node Pref 504 denotes a user preference (Like or Dislike) and the probability distribution tables defined below are constructed temporally during the operation of the Bayesian model.

FIG. 16 illustrates pseudo code corresponding to embodiment algorithm for the construction of a Bayesian model. In an embodiment, three probability distribution tables are defined. The first table is a V-Ads table (P(Ads|V)) that denotes the probability of choosing an advertisement when a specific video segment is selected. In an embodiment, this parameter is calculated, for example, according to the amount of financial support from the advertiser. It is assumed that there are n Ads in a candidate set of a video segments, and the financial sponsor is listed as $(f_1, f_2, \ldots, f_n)$, which is also used as the header of V-Ads table. The $k^{th}$ ads conditional probability is calculated using according to $f_k/\Sigma_{i=1}^{n}f_i$.

The second embodiment table is a Pref-V-Ads table (P(Pref|Ads, V)) that denotes the probability that a user prefers a particular video segment and advertisement combination. This parameter is calculated according to the feedback from user. In an embodiment, head the Pref-V-Ads table is (video segment, advertisement, like, dislike), and the conditional probability is calculated by:

$$P(Pref \mid Ads, V) = \frac{a_{ij}^l}{a_{ij}^l + a_{ij}^d},$$

using the data of user preference matrix.

The third embodiment table is a V table (P(V)) that denotes the probability that a certain video segment was displayed according to the general user preferences, which may be obtained from popular video websites, such as YouTube.com and Hulu.com, in some embodiments.

In an embodiment, during the construction of the Bayesian model, the probability of P(V, Ads, Pr ef)=P(Pr ef|Ads, V)·P(Ads|V)·P(V) is calculated using a Bayesian formula. After the model is constructed, user preference probability is predicted according to:

$$P(Ads, Pref \mid V) = \frac{P(Ads, V, Pref)}{P(V)}.$$

In other words, the probability the conditional probability that certain kind of advertisement is preferred by customer, given the category of video segment. In an embodiment, advertisements are filtered according to the output of this model.

FIG. 17 illustrates pseudo code corresponding to an algorithm for an embodiment Bayesian Filtering Algorithm, and FIG. 18 illustrates pseudo code corresponding to an algorithm for an embodiment Bayesian model updating algorithm.

Figure 19:
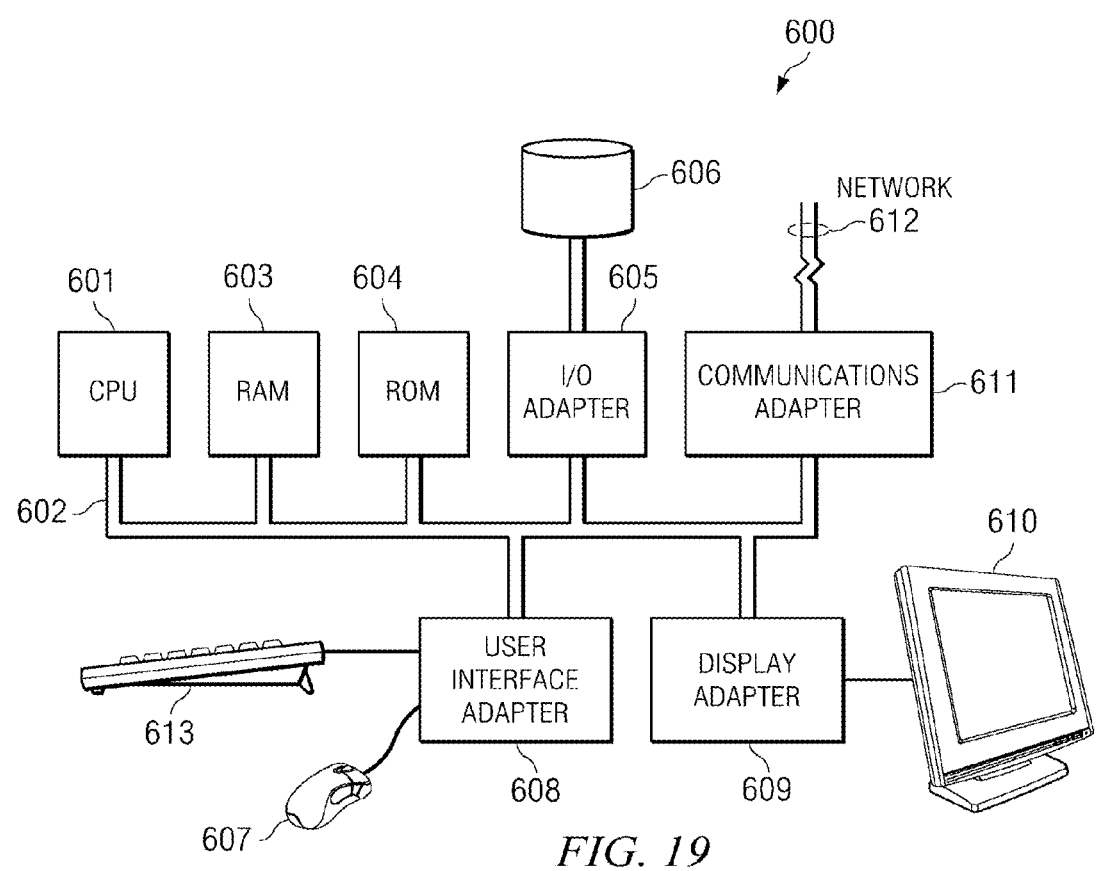
FIG. 19 illustrates an embodiment computer system that implements embodiment algorithms.

FIG. 19 illustrates computer system 600 adapted to use embodiments of the present invention, e.g., storing and/or executing software associated with the embodiments. Central processing unit (CPU) 601 is coupled to system bus 602. CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) adapter 605, communications adapter 611, user interface 608, and display adaptor 609. The I/O adapter 605 connects storage devices 606, such as one or more of a hard drive, a CD drive, a floppy disk drive, a tape drive, to computer system 600. Communications adapter 611 is configured to interface with network 612 The I/O adapter 605 is also connected to a printer (not shown), which would allow the system to print paper copies of information such as documents, photographs, articles, and the like. Note that the printer may be a printer, e.g., dot matrix, laser, and the like, a fax machine, scanner, or a copier machine. User interface adaptor is coupled to keyboard 613 and mouse 607, as well as other devices. Display adapter, which can be a display card in some embodiments, is connected to display device 610. Display device 610 can be a CRT, flat panel display, or other type of display device. In embodiments, system 600 can correspond to a server at the service provider, a server with the video provider, or a user device.

Advantages of embodiments include an ability to provide scene specific targeted advertisement capability that takes into account specific video content and user preferences. A further advantage of some embodiments includes enabling advertisements to be received by different users and different user terminals, in different time frames, and in different location according to the specific context and semantic information according to each user's preference and profile.

An advantage of some embodiments includes the ability to quickly and efficiently determine advertisements for video insertion for a particular user. Furthermore, in some embodiments, the user preferences are updated to track a user's changing preferences.

Advantages of embodiments that employ ontologically based categorization methods include the ability to quickly match advertisements to specific video segments, as well as quickly and efficiently filter a candidate list of advertisements according to a specific user preferences.

Advantages of embodiments that process video metadata, rather than raw video content include efficient transmission and reception of advertising lists. Furthermore, in embodiments that process advertisement lists separate from the actual advertisements themselves, the need for having a user device download a large amount of data devoted to potentially unwatched videos is alleviated.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of matching video content to insertion content, the method comprising: electronically receiving a video content metadata from a first server over a network by a second server, the video content metadata corresponding to video content being sent to a user device over the network by the first server, wherein the first server, second server and user device are separate from each other; and
    using a processor of a second server, matching the video content metadata to a global list of insertion content metadata corresponding to content configured to be inserted within the video content at the user device, wherein
        the video content metadata comprises at least one keyword,
        the insertion content metadata comprises at least one keyword,
        matching the video content metadata to insertion content metadata comprises comparing the at least one keyword of the video content metadata to the at least one keyword of the insertion content metadata, and
        the global list of insertion content metadata is stored on the second server;
    receiving, over the network by the processor of the second server, user preference data from the user device;
    filtering, by the processor of the second server, results of the matching the video content metadata to insertion content metadata to form filtered results, wherein the filtering comprises
        utilizing user preference data from a user preference matrix to perform the filtering results, the user preference matrix comprising preference values according to rows indexed by video categories and columns indexed by a plurality of insertion categories, wherein the user preference matrix comprises values based on the received user preference data, and
        adjusting the user preference data according to user profile data in a user profile matrix, the user profile matrix comprising further preference data according to the plurality of insertion categories, wherein the user profile matrix comprises rows indexed by user profile categories and columns indexed by the plurality of insertion categories, wherein the adjusting comprises
            selecting a row of the user preference matrix corresponding to a video category,
            determining weights from at least one row of the user profile matrix, and
        applying the weights to the row of the user preference matrix to form an adjusted row of the user preference matrix;
    transmitting, over the network by the second server, the filtered results to the user device to specify actual insertion content for the user device to insert into the video content;
    after transmitting the filtered results, receiving, by the second server, a request from the user device for the actual insertion content specified in the filtered results that the user device determined to correspond with video content received by the user device from the first server;
    transmitting by the second server over the network the actual insertion content to the user device for subsequent insertion of the actual insertion content in the video content received by the user device from the first server;
    receiving, by the user device, the video content from the first server;
    receiving, by the user device, the filtered results from the second server;
    selecting, by the user device, the actual insertion content specified in the filtered results based on the video content;
    transmitting, by the user device, the request for the actual insertion content to the second server;
    receiving, by the user device, the actual insertion content from the second server; and
    playing back the video content and the actual insertion content.

2. The method of claim 1, wherein the video content comprises a plurality of video segments, and each video segment of the plurality of video segments is associated with a category from a plurality of categories.

3. The method of claim 1, further comprising:
receiving user feedback information the user device; and
adjusting the user preference data based on the user feedback information.

4. The method of claim 3, wherein adjusting the user preference data comprises adjusting the user preference data according to a history of user preference data.

5. The method of claim 4, further comprising applying a sliding window to the history of user preference data.

6. The method of claim 1, wherein matching the video content metadata to the insertion content metadata comprises:
incrementing a match metric in accordance with the comparing;
comparing the incremented match to a predetermined threshold; and
when the incremented match exceeds the predetermined threshold, add the inserted content to a first table of insertion content.

7. The method of claim 1, wherein matching the video content metadata to insertion content metadata further comprises using a lexical database to match keywords.

8. The method of claim 1, wherein
the video content metadata further comprises a first synopsis comprising a written description of the video content;
the insertion content metadata further comprises a second synopsis comprising a written description of the insertion content; and
matching the video content metadata to insertion content metadata further comprises comparing words of the first synopsis with words of the second synopsis, comparing comprising using a lexical database to match similar words.

9. The method of claim 1, wherein:
the video content comprises a plurality of video segments;
each video segment is associated with at least one keyword; and
matching the video content metadata further comprising matching the video content metadata to the insertion content metadata on a segment by segment basis.

10. A method of matching video content to insertion content, the method comprising:
electronically receiving video content metadata from a first server over a network by a second server, the video content metadata corresponding to video content being sent to a user device over the network by the first server, wherein the first server, second server and third server are separate from each other;
using a processor of a second server, matching the video content metadata to insertion content metadata of a global list of insertion content, the insertion content metadata corresponding to insertion content, wherein the video content metadata comprises a first category taken from an ontological structure, and the insertion content metadata comprises a second category taken from the ontological structure, wherein matching the video content metadata to the insertion content metadata further comprises comparing the first category to the second category; and
generating a first list of insertion content based on the matching;
generating, by the second server, a first list of insertion content in accordance with the matching;
receiving, over the network by the second server, user preference data from the user device;
filtering, by the second server, the first list of insertion content prior to transmitting any of the first list of insertion content to form a filtered list of insertion content, wherein the filtering the first list is performed at least in part using the user preference data, wherein the user preference data comprises a user preference matrix, the user preference matrix comprising preference values according to rows indexed by video categories and columns indexed by a plurality of insertion content categories, wherein the user preference matrix comprises values based on the received user preference data;
adjusting the user preference data according to user profile data in a user profile matrix, wherein the user profile matrix comprises further preference data according to the plurality of insertion content categories and comprises rows indexed by user profile categories and columns indexed by the plurality of insertion content categories and wherein the adjusting comprises
selecting a row of the user preference matrix,
selecting at least one row of the user profile matrix,
calculating weights from the at least one row of the user profile matrix, and
applying the weights to the row of the user preference matrix to adjust the row of the user preference matrix;
forwarding, over the network by the second server, the filtered list of insertion content to the user device to specify actual insertion content for the user device to insert into the video content;
after transmitting the filtered list of insertion content, receiving, by the second server, a request from the user device for an actual insertion content specified in the filtered list of insertion content that the user device determined to correspond with video content received by the user device from the first server;
transmitting by the second server over the network the actual insertion content to the user device for subsequent insertion of the actual insertion content in the video content received by the user device from the first server;
receiving, by the user device, the video content from the first server;
receiving, by the user device, the filtered list of insertion content from the second server;
selecting, by the user device, the actual insertion content specified in the filtered list of insertion content based on the video content;
transmitting, by the user device, the request for the actual insertion content to the second server;
receiving, by the user device, the actual insertion content from the second server; and
playing back the video content and the actual insertion content.

11. The method of claim 10, wherein
the ontological structure comprises a first plurality of top level categories; and
at least one of the first plurality of top level categories comprises a second plurality of subcategories.

12. The method of claim 11, wherein the first plurality of top level categories comprises a combined object and participation category, the combined object and participation category comprising subcategories pertaining to live and inanimate objects.

13. The method of claim 11, wherein the first plurality of top level categories comprises a process category, the process category comprising human event driven subcategories.

14. The method of claim 10, wherein at least one category taken from the ontological structure is applied to a local portion of the video content.

15. A system for matching video content to insertion content, the system comprising:
a user device;
a metadata matcher configured to receive video content metadata from a first server and match the video content metadata to insertion content metadata of a global list of insertion content, wherein
the insertion content metadata corresponds to the insertion content, the video content metadata corresponds to the video content sent to the user device from the first server,
the metadata matcher is implemented with a second server, wherein
the video content metadata comprises at least one keyword,
the insertion content metadata comprises at least one keyword,
the metadata matcher matches the video content metadata to insertion content metadata by comparing the at least one keyword of the video content metadata to the at least one keyword of the insertion content metadata, and
the first server, the second server and the user device are separate from each other;
an insertion content filter of the second server, wherein the insertion content filter configured to receive user preference data from the user device, and to filter a resultant list from the metadata matcher to generate a resultant filtered list, wherein
the insertion content filter is configured to filter the resultant list according to the user preference data in a user preference matrix,
the user preference matrix comprises preference values according to rows indexed by video categories and columns indexed by a plurality of insertion content categories, and
the insertion content filter is further configured to adjust the user preference data according to user profile data, wherein the adjusting the user preference data comprises
selecting a row of the user preference matrix,
selecting a row of a user profile matrix within the user profile data,
wherein the user profile matrix comprises further preference data according to the plurality of insertion content categories and comprises rows indexed by user profile categories and columns indexed by the plurality of insertion content categories,
using the row of the user profile matrix to determine weights, and
applying the weights to the row of the user preference matrix to form an adjusted row of the user preference matrix,
the second server is configured to
transmit, over a network, the filtered list to the user device to specify actual insertion content for the user device to insert into the video content,
after transmitting the filtered list, receive a request from the user device for an actual insertion content specified in the filtered list that the user device determined to correspond with video content received by the user device from the first server, and
transmit over the network the actual insertion content to the user device for subsequent insertion of the actual insertion content in the video content received by the user device from the first server, and
the user device is configured to
receive the video content from the first server,
receive the filtered list from the second server,
select the actual insertion content specified in the filtered list based on the video content,
transmit the request for the actual insertion content to the second server,
receive the actual insertion content from the second server; and
play back the video content and the actual insertion content.

16. The system of claim 15, wherein the metadata matcher matches the video content metadata to the insertion content metadata by incrementing a match metric based on the comparing, comparing the incremented match to a predetermined threshold; and
if the increment match exceeds the predetermined threshold, add the insertion content to a first table of insertion content.

17. The system of claim 15, wherein the metadata matcher matches the video content metadata to insertion content metadata by using a lexical database to match keywords.

18. The system of claim 15, further comprising a communications adaptor that receives video content metadata from a first server, the video content metadata corresponding to video content being sent to a user device.

19. The system of claim 15, wherein
the video content metadata further comprises a first synopsis comprising a written description of the video content;
the insertion content metadata further comprises a second synopsis comprising a written description of the insertion content; and
the metadata matcher further matches the video content metadata to insertion content metadata by comparing words of the first synopsis with words of the second synopsis, comparing comprising using a lexical database to match similar words.

20. The system of claim 15, wherein:
the video content comprises a plurality of video segments; and
matching the video content metadata further comprising matching the video content metadata to the insertion content metadata on a segment by segment basis.

21. A method of matching video content to insertion content, the method comprising:
electronically receiving user preference data from a user device over a network by a first server; and
filtering, by the first server, matched video content metadata to insertion content metadata to form a filtered results, wherein
the matched video content metadata is based on video content metadata received from a second server over the network,
the matched video content metadata corresponding to video content being sent to the user device, and
the first server, the second server and the user device are separate from each other, filtering comprises
    utilizing, by the first server, user preference data from a user preference matrix to perform the filtering results, the user preference matrix comprising preference values according to rows indexed by video categories and columns indexed by a plurality of insertion content categories, wherein the user preference matrix comprises values based on the received user preference data, and
    adjusting, by the first server, the user preference data according to user profile data in a user profile matrix,
the user profile matrix comprises further preference data according to the plurality of insertion content categories,
the user profile matrix comprises rows indexed by user profile categories and columns indexed by the plurality of insertion content categories, and
the adjusting comprises
    selecting a row of the user preference matrix corresponding to a video category,
    determining weights from at least one row of the user profile matrix, and
    applying the weights to the row of the user preference matrix to form an adjusted row of the user preference matrix;
transmitting, over the network by the first server, the filtered results to the user device to specify actual insertion content for the user device to insert into the video content;
after transmitting the filtered results, receiving, by the first server, a request from the user device for an actual insertion content specified in the filtered results that the user device determined to correspond with video content received by the user device from the second server; and
transmitting by the first server over the network the actual insertion content to the user device for subsequent insertion of the actual insertion content in the video content received by the user device from the second server;
receiving, by the user device, the video content from the second server;
receiving, by the user device, the filtered results from the first server;
selecting, by the user device, the actual insertion content specified in the filtered results based on the video content;
transmitting, by the user device, the request for the actual insertion content to the first server;
receiving, by the user device, the actual insertion content from the first server; and
playing back the video content and the actual insertion content.

22. The method of claim 21, further comprising calculating a preference value based on the user preference matrix.

23. The method of claim 22, wherein adjusting the user preference data according to the user profile data and calculating the preference value comprises using a preference and profile (PNP) based Bayesian engine.

24. The method of claim 21, wherein each element in the user profile matrix and the user preference matrix comprises an $a_{ij}^{l}$ value denoting a positive user disposition and an $a_{ij}^{d}$ value denoting a negative user disposition; and
    the determining weights comprises calculating a weight according to:

$$\text{Weight} = \frac{a_{ij}^{l} - a_{ij}^{d}}{(a_{ij}^{l} + 1)(a_{ij}^{d} + 1)};$$

applying the weights to the user preference matrix comprises
    if the weight is greater than 0, then the weight is applied to $a_{ij}^{l}$ of the user preference matrix such that $a_{ij}^{l} = a_{ij}^{l}(1+ \text{Weight})$, and
    if the weight is not greater than 0, then the weight is applied to $a_{ij}^{l}$ of the user preference matrix such that $a_{ij}^{l} = a_{ij}^{l}(1+ \text{Weight})$.

25. The method of claim 24, further comprising applying the following expression to elements in the row of the user preference matrix:

$$P = \frac{a_{ij}^{l} - a_{ij}^{d}}{(a_{ij}^{l} + 1)(a_{ij}^{d} + 1)}.$$

26. The method of claim 25, wherein the weight and the preference value are between −1 and 1.

27. The method of claim 25, wherein:
each element in the user profile matrix and the user preference matrix further comprises a history of a last N user values; and
the method further comprises calculating the $a_{ij}^{l}$ and $a_{ij}^{d}$ values according to the history of the last N user values.

28. The method of claim 21, further comprising
receiving user feedback information from the user device; and
adjusting the user preference data based on the user feedback information.

29. The method of claim 28, wherein adjusting the user preference data comprises adjusting the user preference data according to a history of user preference data.

30. The method of claim 29, further comprising applying a sliding window to the history of user preference data.

* * * * *